(12) United States Patent
Monroe

(10) Patent No.: US 8,589,994 B2
(45) Date of Patent: Nov. 19, 2013

(54) COMPREHENSIVE MULTI-MEDIA SURVEILLANCE AND RESPONSE SYSTEM FOR AIRCRAFT, OPERATIONS CENTERS, AIRPORTS AND OTHER COMMERCIAL TRANSPORTS, CENTERS AND TERMINALS

(76) Inventor: David A. Monroe, San Antonio, TX (US)

( * ) Notice: Subject to any disclaimer, the term of this patent is extended or adjusted under 35 U.S.C. 154(b) by 58 days.

(21) Appl. No.: 11/485,100

(22) Filed: Jul. 12, 2006

(65) Prior Publication Data
US 2007/0130599 A1    Jun. 7, 2007

Related U.S. Application Data

(63) Continuation of application No. 10/192,870, filed on Jul. 10, 2002, now Pat. No. 7,131,136.

(51) Int. Cl.
*H04N 7/173*        (2006.01)
(52) U.S. Cl.
USPC ........... 725/105; 725/108; 725/109; 725/118; 725/148; 348/148; 348/152; 348/159; 348/153; 701/14; 701/2; 340/945; 340/963
(58) Field of Classification Search
USPC .......... 725/105, 108, 109, 118, 148; 348/144, 348/148, 152, 153, 154, 155, 156, 159; 340/945, 963; 701/14, 2
See application file for complete search history.

(56) References Cited

U.S. PATENT DOCUMENTS

| | | | |
|---|---|---|---|
| 4,163,283 A | 7/1979 | Darby | |
| 4,179,695 A | 12/1979 | Levine et al. | |
| 4,197,536 A | 4/1980 | Levine | |
| 4,516,125 A | 5/1985 | Schwab et al. | |
| 4,816,828 A * | 3/1989 | Feher | 340/945 |
| 4,831,438 A | 5/1989 | Bellman, Jr. et al. | |
| 4,845,629 A | 7/1989 | Murga | |
| 4,857,912 A | 8/1989 | Everett, Jr. et al. | |
| 4,891,650 A | 1/1990 | Sheffer | |

(Continued)

FOREIGN PATENT DOCUMENTS

| | | |
|---|---|---|
| EP | 220752 | 5/1987 |
| EP | 232031 | 8/1987 |

(Continued)

OTHER PUBLICATIONS

Apr. 1966, Apollo Unified S-Band System, NASA-Goddard Space Flight Center, Greenbelt, Maryland.

(Continued)

*Primary Examiner* — Shawn An

(57) ABSTRACT

A data collection and distribution system for monitoring aircraft in flight, on the ground and at the gate or terminal for monitoring critical and catastrophic events, managing the emergency during such an event, and for investigating the event. The system generates, transmits and collects critical data generated by monitoring equipment onboard an aircraft or other commercial transport and selectively displays the data on a cockpit display console as well as for downloading, transmitting and displaying data at external monitoring and response stations, including fixed ground stations, roving ground stations and chase aircraft or vehicles. Digital surveillance information is collected, processed, dispatched, and log via remote control and access. The system includes a variety of system appliances such as surveillance cameras, sensors, detectors, and panic buttons and accommodates legacy equipment. Within the commercial transport, the system maybe hardwired or may use wireless transmission and receiving systems.

3 Claims, 10 Drawing Sheets

(56) References Cited

U.S. PATENT DOCUMENTS

| | | |
|---|---|---|
| 4,910,692 A | 3/1990 | Outram |
| 5,027,104 A | 6/1991 | Reid |
| 5,027,114 A | 6/1991 | Kawashime et al. |
| 5,091,780 A | 2/1992 | Pomerleau |
| 5,111,291 A | 5/1992 | Erickson |
| 5,166,746 A | 11/1992 | Sato et al. |
| 5,218,367 A | 6/1993 | Sheffer et al. |
| 5,243,340 A | 9/1993 | Norman et al. |
| 5,243,530 A | 9/1993 | Stanifer et al. |
| 5,268,698 A | 12/1993 | Smith, Sr. et al. |
| 5,283,643 A | 2/1994 | Fujimoto |
| 5,321,615 A | 6/1994 | Frisbie et al. |
| 5,334,982 A | 8/1994 | Owen |
| 5,351,194 A | 9/1994 | Ross et al. |
| 5,400,031 A | 3/1995 | Fitts |
| 5,408,330 A | 4/1995 | Squicciarini et al. |
| 5,432,838 A | 7/1995 | Purchase |
| 5,440,337 A | 8/1995 | Henderson et al. |
| 5,440,343 A | 8/1995 | Parulski |
| 5,448,243 A | 9/1995 | Bethke et al. |
| 5,463,595 A | 10/1995 | Rochall et al. |
| 5,469,371 A | 11/1995 | Bess |
| 5,497,149 A | 3/1996 | Fast |
| 5,508,736 A | 4/1996 | Cooper |
| 5,530,440 A | 6/1996 | Denzer et al. |
| 5,553,609 A | 9/1996 | Chen et al. |
| 5,557,254 A | 9/1996 | Johnson et al. |
| 5,557,278 A | 9/1996 | Piccirillo et al. |
| 5,598,167 A | 1/1997 | Zjderhand |
| 5,612,668 A | 3/1997 | Scott |
| 5,627,753 A | 5/1997 | Brankin et al. |
| 5,629,691 A | 5/1997 | Jain |
| 5,636,122 A | 6/1997 | Shah et al. |
| 5,642,285 A | 6/1997 | Woo |
| 5,666,157 A | 9/1997 | Avid |
| 5,670,961 A | 9/1997 | Tomote et al. |
| 5,677,979 A | 10/1997 | Squicciarini |
| 5,689,442 A | 11/1997 | Swanson |
| 5,712,679 A | 1/1998 | Coles |
| 5,712,899 A | 1/1998 | Pace, II |
| 5,714,948 A | 2/1998 | Farmakis et al. |
| 5,742,336 A | 4/1998 | Lee |
| 5,751,346 A | 5/1998 | Dozler |
| 5,777,551 A | 7/1998 | Hess |
| 5,777,580 A | 7/1998 | Janky et al. |
| 5,793,416 A | 8/1998 | Rostoker et al. |
| 5,835,059 A | 11/1998 | Nadel et al. |
| 5,850,180 A | 12/1998 | Hess |
| 5,867,804 A | 2/1999 | Pilley et al. |
| 5,917,405 A | 6/1999 | Joso |
| 5,926,210 A | 7/1999 | Hackett et al. |
| 5,927,648 A | 7/1999 | Woodland |
| 5,933,098 A | 8/1999 | Haxton |
| 5,938,706 A | 8/1999 | Feldman |
| 5,974,158 A | 10/1999 | Auty et al. |
| 5,983,161 A | 11/1999 | Lemelson et al. |
| 5,999,116 A | 12/1999 | Evers |
| 6,002,427 A | 12/1999 | Kipust |
| 6,009,356 A | 12/1999 | Monroe |
| 6,044,257 A * | 3/2000 | Boling et al. ............... 455/404.2 |
| 6,067,571 A | 5/2000 | Igarashi et al. |
| 6,069,655 A | 5/2000 | Seeley |
| 6,078,850 A | 6/2000 | Kane et al. |
| 6,084,510 A | 7/2000 | Lemelson et al. |
| 6,092,008 A * | 7/2000 | Bateman ........................ 701/14 |
| 6,100,964 A | 8/2000 | De Cremiers |
| 6,133,941 A | 10/2000 | Ono |
| 6,154,658 A | 11/2000 | Caci |
| 6,157,317 A | 12/2000 | Walker |
| 6,167,239 A * | 12/2000 | Wright et al. ................ 455/66.1 |
| 6,181,373 B1 | 1/2001 | Coles |
| 6,195,609 B1 | 2/2001 | Pilley et al. |
| 6,226,031 B1 | 5/2001 | Barraciough et al. |
| 6,246,320 B1 | 6/2001 | Monroe |
| 6,259,475 B1 | 7/2001 | Ramachandran et al. |
| 6,275,231 B1 | 8/2001 | Obradovich |
| 6,278,965 B1 | 8/2001 | Glass et al. |
| 6,281,970 B1 | 8/2001 | Williams et al. |
| 6,282,488 B1 | 8/2001 | Castor et al. |
| 6,292,098 B1 | 9/2001 | Ebata |
| 6,356,625 B1 | 3/2002 | Casteiani |
| 6,373,521 B1 | 4/2002 | Carter |
| 6,385,772 B1 | 5/2002 | Courtney |
| 6,424,370 B1 | 7/2002 | Courtney |
| 6,462,697 B1 | 10/2002 | Klamer et al. |
| 6,476,858 B1 | 11/2002 | Ramirez Diaz et al. |
| 6,504,479 B1 | 1/2003 | Lemons |
| 6,522,532 B2 | 2/2003 | Liao et al. |
| 6,525,761 B2 | 2/2003 | Sato et al. |
| 6,549,130 B1 | 4/2003 | Joso |
| 6,556,241 B1 | 4/2003 | Yoshimura et al. |
| 6,570,610 B1 | 5/2003 | Kipust |
| 6,628,835 B1 | 9/2003 | Brill |
| 6,641,087 B1 * | 11/2003 | Nelson ....................... 244/118.5 |
| 6,646,676 B1 | 11/2003 | DaGrace et al. |
| 6,662,649 B1 | 12/2003 | Knight et al. |
| 6,675,386 B1 | 1/2004 | Hendricks et al. |
| 6,698,021 B1 | 2/2004 | Amini |
| 6,720,990 B1 | 4/2004 | Walker et al. |
| 6,751,297 B2 * | 6/2004 | Nelkenbaum .............. 379/88.13 |
| 6,769,645 B1 * | 8/2004 | Truong et al. ................ 244/76 R |
| 7,113,971 B1 | 9/2006 | Ohi et al. |
| 7,131,136 B2 * | 10/2006 | Monroe ........................ 725/105 |
| 2003/0071899 A1 | 4/2003 | Joso |
| 2005/0055727 A1 | 3/2005 | Creamer et al. |
| 2005/0130803 A1 | 6/2005 | Rastegar |

FOREIGN PATENT DOCUMENTS

| | | |
|---|---|---|
| EP | 532110 | 3/1993 |
| EP | 209397 | 7/1993 |
| EP | 613109 | 8/1994 |
| EP | 613110 | 8/1994 |
| EP | 744630 | 11/1996 |
| EP | 785536 | 7/1997 |
| EP | 613111 | 8/1998 |
| JP | 6-301898 | 10/1994 |
| JP | 9-282600 | 10/1997 |
| JP | HEI-10-66058 | 3/1998 |
| JP | A-10-155040 | 6/1998 |
| JP | 9-251599 | 4/1999 |
| JP | 11-160424 | 6/1999 |
| WO | WO90/04242 | 4/1990 |
| WO | WO95/27910 | 10/1995 |
| WO | WO96/12265 | 4/1996 |
| WO | WO97 37336 | 10/1997 |
| WO | WO98/52174 | 11/1999 |

OTHER PUBLICATIONS

Nov. 24, 1976, Telexis ViaNet General Information Booklet Version 1.3.
2000, ViaNet 3000 Administrator's Manual Version 1.1—NetXpress Video by Telexis, Kanata, Ontario, Canada.
1999 Vianet 3000 Operator Manual Version 1.0—NetXpress Video by Telexis, Kanata, Ontario, Canada.
1999 ViaNet 3000 Administrator Manual Version 1.0—NetXpress Video by Telexis, Kanata, Ontario, Canada.
1999 ViaNet 3000 Instruction Manual Operator's Revision 1—NetXpress Video by Telexis, Kanata, Ontario, Canada.

* cited by examiner

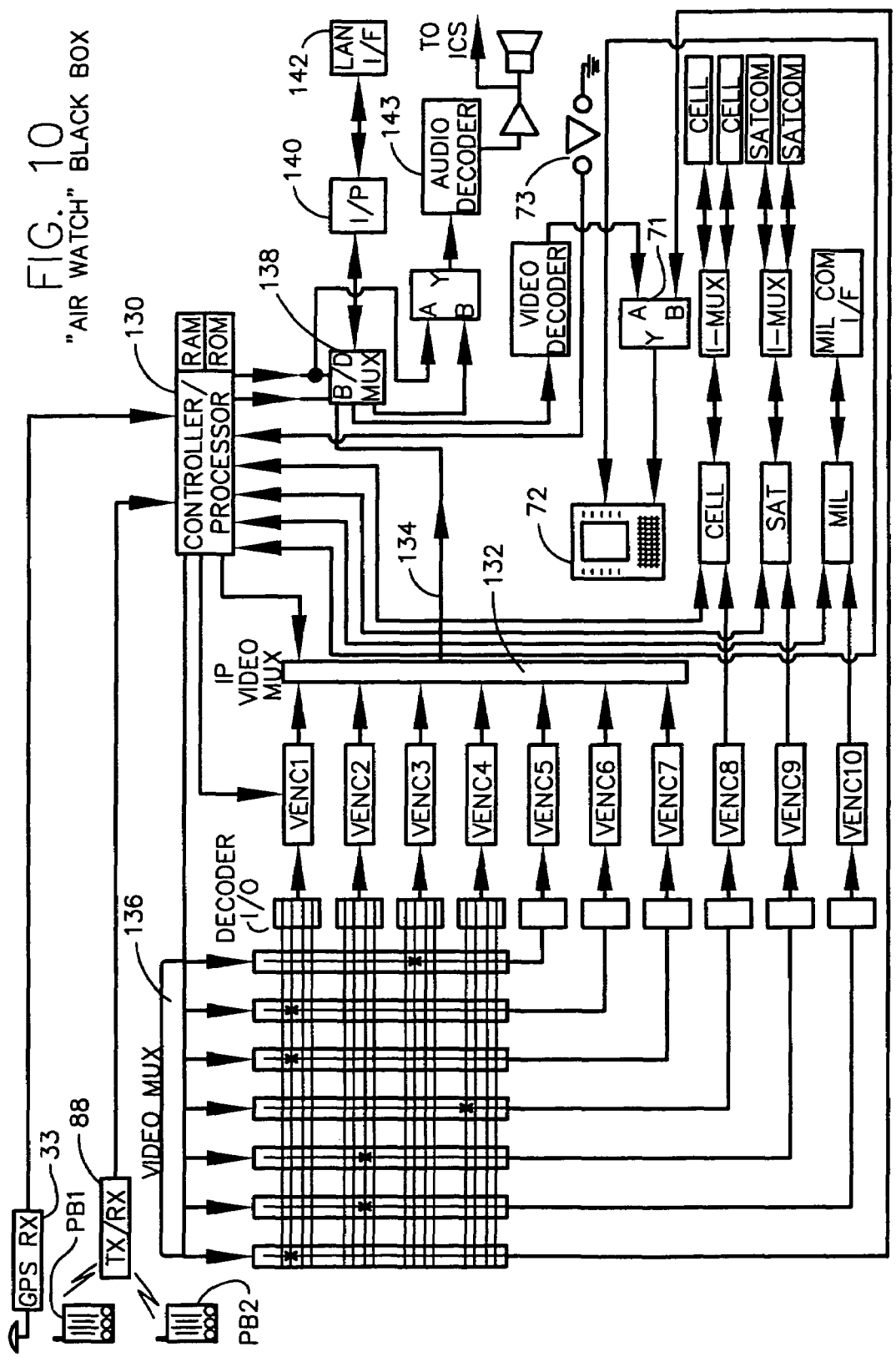

COMPREHENSIVE MULTI-MEDIA SURVEILLANCE AND RESPONSE SYSTEM FOR AIRCRAFT, OPERATIONS CENTERS, AIRPORTS AND OTHER COMMERCIAL TRANSPORTS, CENTERS AND TERMINALS

CROSS REFERENCE TO RELATED APPLICATIONS

The present patent application is a continuation of and claims priority from patent application Ser. No. 10/192,870, entitled COMPREHENSIVE MULTI-MEDIA SURVEILLANCE AND RESPONSE SYSTEM FOR AIRCRAFT, OPERATIONS CENTERS, AIRPORTS AND OTHER COMMERCIAL TRANSPORTS, CENTERS AND TERMINALS, filed on Jul. 10, 2002 now U.S. Pat. No. 7,131,136 the entire contents of which are enclosed by reference herein.

BACKGROUND OF THE INVENTION

The subject invention is generally related to surveillance and security systems for monitoring commercial transports such as aircraft or over-the-road vehicles, transportation transports and terminals, such as aircraft and airports, and emergency response vehicles and personnel. In the case of airborne operations, aircraft and airport surveillance and security is provided while the aircraft is in the air, on the ground and at the terminal. For all types of transports and terminals, the invention is specifically directed to electronic safety and surveillance systems comprising a comprehensive multi-media security surveillance and response system on a transportation platform when in motion and from the vicinity of the transportation platform when it is near or at its destination. The invention is adapted for collecting critical event data and for assessing the location and type of event for distributing the information to key response personnel based on location and capability. The invention can be utilized for: 1) preventing critical and catastrophic events, 2) for managing the emergency during such an event, and 3) for investigation support after the occurrence of such an event.

DISCUSSION OF THE PRIOR ART

Security of transports such as aircraft, buses, trains and the like and facilities such as airports, schools, banks, arenas and the like has been a topic of increasing concern in recent years. Over the past few years, a number of violent incidents including hijackings, bombings, shootings, arson, and hostage situations have occurred. The loss of life and property has reached extraordinary levels mandating increased levels of security.

In addition, with increasing numbers of private and commercial flights occurring, larger numbers of incidents and accidents are happening. The causes of many of these events, particularly those that have catastrophic outcomes such as mid-air explosions and crashes, remain unknown. Recovery operations and investigations can be exceedingly costly with uncertain outcome. Such investigations have cost fifty to one hundred million dollars or more such as the investigation of the TWA-800 mid-air explosion and crash in 1996 and the Swiss Air Flight 111 crash off Nova Scotia in 1998. The lack of totally conclusive evidence has left the victims families without closure, has set the ground for enormously expensive and complex litigation on the matter, and has not allowed preventative measures to be taken.

Electronic systems already have greatly enhanced the safety record of commercial aircraft. Global tracking systems are now in place to monitor the flight of the aircraft. Radar and global positioning systems are commonplace. All of these electronic systems have increased the ability to track performance of an aircraft from the moment it lifts off until it safely lands. In addition, onboard avionics include monitoring and diagnostic equipment, particularly on large commercial jets. This continues to evolve, giving both the onboard crew and the tracking station more complete, accurate and up-to-date information regarding the condition of the aircraft while in flight.

Flight recorders also long have been incorporated in order to provide a record of each flight and in order to provide critical information to aid in the determination of the causes of an accident or malfunction should one occur. In the prior art systems, typically two flight recorders are utilized, one for voice (commonly called the "cockpit voice recorder") and one for data (commonly called the "flight data recorder"). Transducers, sensors and other monitoring equipment are hardwired to the onboard "black box" data recorders and to various display panels in the cockpit. The voice data recorder collects cockpit audio and radio communications. While the data collected and transmitted by this equipment provides useful real-time information to the flight crew and is useful in reconstructing the cause and effect of catastrophic incidents, the systems of the prior art have shortcomings reducing the effectiveness of the data.

Typically, the systems of the prior art will stop collecting data once there has been a structural failure of the airframe or a disruption in aircraft power. This is because the transmission of power to the collectors is disrupted or because the aircraft power source ceases to operate. This precludes the collection and transmission of critical data at the very moment when it is most critical, i.e., at the moment when and the time after a catastrophic event occurs.

Prior-art systems also just collect data for post-event analysis. Flight Data Recorders are subject to damage or loss as a result of the catastrophic event, thus the critical information needed to determine the cause of the incident is lost. Further, with these systems there is no mechanism for automated real-time "event detection" and notification, nor is there any manner for the crew of the transport to "trigger" the system to provide notification of an emergency situation to operations and response personnel.

It would be highly desirable to be able to "see" inside the airplane cabin and cockpit as events unfold, in order to assess the event and to plan for an appropriate response. Prior art systems do not have the capability of collecting and relaying such information, and further, are not 'intelligent' in the modem sense; they merely provide an 'ON/OFF' indication or analog meter readings to the centralized monitoring system.

The implementation of onboard sensor systems are not 'networked' in the modem sense; they are generally hardwired to the centralized monitoring system via a 'current loop' or similar arrangement, and do not provide situational data other than their ON/OFF or meter status. Networked "appliance" architecture for sensors, including wireless appliances, would provide an improved capability of monitoring transport conditions.

Air-to-ground transmission of video from an aircraft to the ground currently is limited to specialized applications of short distance line-of-sight transmission of video airborne observation and broadcast, search and rescue, drug interdiction, surveillance and reconnaissance, navigation safety, border and maritime patrol. A typical installation would be one utilized for ENG (Electronic New Gathering) applications consisting of a single television camera or a single specialized sensor device such as a FLIR (Forward Looking InfraRed) night vision sensor or a dual day/night sensor mounted on a helicopter. FLIR Systems, Inc. manufactures and installs a wide varied of these systems, for example. These installations traditionally are standard broadcast video format analog video sensors (NTSC, PAL, or SECAM) which are transmitted on wireless analog transmitters such as FM UHF or microwave line-of-site transmitters from the air to a ground receiver. Limitations of these systems are the limited number of channels available, bandwidth requirement and short operating range, such as coverage over a single metropolitan area. This technology is unusable for high-speed aircraft traveling at high altitudes and covering a large terrain.

Military systems for image and video reconnaissance and transmission are also in operation, such as the PhotoTelesis Corporation FTI (Fast Tactical Imaging) systems and PRISM systems utilized on the F-14, F-16, F/A 18, Apache, OH-58D and other military aircraft. These systems also provide capability of transmitting images or "step-video" captured from military FLIR systems. The typical transmission media is either line-of-sight VHF or UHF military radios, or UHF military tactical satellite. Air-to-ground or air-to-air transmission of images can be accomplished. Although the military systems can transmit images over long distances utilizing military satellites, the limitations on this system prevent transmission of full-motion images and prevent transmission over commercial circuits because of the specialized nature of the military radios and encryption devices that are utilized.

Video surveillance systems in common use today are ground based systems and are particularly dated—they are generally of low capability, using analog signals conveyed over coaxial or, occasionally, twisted-pair cabling to the centralized local monitoring facility. Such visual information is generally archived on magnetic tape using analog video recorders. Further, such systems generally do not have the ability to 'share' the captured video, and such video is generally viewable only on the system control console.

Prior art systems have typically employed analog cameras, using composite video at frame rates at the standard 30 frames/second. Many such systems have been monochrome systems, which are less costly and provide marginally better resolution with slightly greater sensitivity under poor lighting conditions than current analog color systems. Traditional video cameras have used CCD or CMOS area sensors to capture the desired image. The resolution of such cameras is generally limited to the standard CCTV 300-350 lines of resolution, and the standard 480 active scan lines.

Such cameras are deployed around the area to be observed, and are connected to a centralized monitoring/recording system via coaxial cable or, less often, twisted-pair (UTP) wiring with special analog modems. In rare cases they are connected with fiber optics by utilizing fiber optic video modulators and demodulators. The signals conveyed over such wiring are almost universally analog, composite video. Base-band video signals are generally employed, although some such systems modulate the video signals onto an RF carrier, using either AM or FM techniques. In each case, the video is subject to degradation due to the usual causes—cross talk in the wiring plant, AC ground noise, interfering carriers, distance limitations, and so on.

More recently, a few security cameras have employed video compression technology, enabling the individual cameras to be connected to the centralized system via telephone circuits. Due to the bandwidth constraints imposed by the public-switched telephone system, such systems are typically limited to low-resolution images, or low frame rates, or both.

Other more modem cameras have been designed for "web cam" use on the Internet. These often low cost cameras use digital techniques for transmission, however their use for security surveillance is limited by low resolution and by slow refresh rates. These cameras are also designed for use by direct connection to PC's, such as by Printer, USB or Firewire Ports. Thus, for a security system, the installation cost and effectiveness is limited with the unwieldy restriction of requiring a PC at each camera.

Each of these prior-art systems suffers functional disadvantages. The composite video/coaxial cable approach provides full-motion video but can only convey it to a local monitoring facility. The low-bit rate approach can deliver the video signal to a remote monitoring facility, but only with severely degraded resolution and frame rate. Neither approach has been designed to provide access to any available video source from several monitoring stations.

Another commonplace example is the still-image compression commonly used in digital cameras. These compression techniques may require several seconds to compress a captured image, but once done the image has been reduced to a manageably small size, suitable for storage on inexpensive digital media (e.g., floppy disk) or for convenient transmission over an inexpensive network connection.

Prior-art surveillance systems have been oriented towards single-point centralized monitoring of the various cameras. While useful, this approach lacks the functional flexibility possible with more modem networking technologies.

Other hardwired systems have been used, such as fiberoptic cable and the like, but have not been widely accepted primarily due to the higher costs associated with such systems over coaxial cable. Coaxial cable, with all of its limitations, remains the usual system of choice to the present day. Also available are techniques using less expensive and common twisted pair cable such as that commonly used for distribution of audio signals such as in telephone or office intercom applications. This cable is often referred to as UTP (twisted pair) or STP (shielded twisted pair) cable. Both analog and digital techniques have been implemented. This general style of twisted pair cable (but in a more precise format) is also widely used in Local Area Networks, or LAN's, such as the 10 Base-T Ethernet system, 100 Base-T, 1000 Base-T (also called "gigibit Ethernet) and the like. Newer types of twisted pair cable have been developed that have lower capacitance and more consistent impedance than the early telephone wire. These newer types of cable, such as "Category 5" wire, are better suited for higher bandwidth signal transmission and are acceptable for closed circuit video applications with suitable special digital interfaces. By way of example, typical analog audio voice signals are approximately 3 kilohertz in bandwidth, whereas typical analog video television signals are 3 megahertz in bandwidth or more. Even with the increased bandwidth capability of this twisted pair cable, the video signals at base-band (uncompressed) can typically be distributed directly over twisted pair cable only a few hundred feet. In order to distribute video over greater distances, video modulators and demodulators are inserted between the camera and the twisted pair wiring and again between the twisted pair wiring and the monitor. Twisted pair cable is lower in cost than coaxial cable and is easier to install. For the longest distances for distribution of video, the video signals are digitally compressed for transmission and decompressed at the receiving end.

Wireless systems utilizing RF energy are also available. Such systems usually consist of a low power UHF transmitter and antenna system compatible with standard television monitors or receivers tuned to unused UHF channels. The FCC allows use of this type of system without a license for very low power levels in the range of tens of milliwatts. This type of system provides an economical link but does not provide transmission over significant distances due to the power constraints placed on the system. It is also highly susceptible to interference due to the low power levels and shared frequency assignments. The advantage of this system over hardwired systems is primarily the ease of installation. However, the cost is usually much higher per unit, the number of channels is limited and system performance can be greatly affected by building geometry or nearby electrical interference. Further, the video is not as secure as hardwired systems. The video may be picked up by anyone having access to the channel while in range of the transmitter and is thus, easily detected and/or jammed.

Another area that is difficult to implement with current closed circuit television systems is the control of lenses, tilt/pan mechanisms, and other video adjustments. Most installations do not attempt this level of control because of the expense of running additional wiring and installing additional controller devices required to control these mechanisms. For example, the installation of an analog camera with a tilt/pan unit and a motorized lens can require multiple cables. A video coax, a large gauge power wire for the camera, a multi-conductor control wire for the tilt/pan and a control wire for the lens can be required. Video adjustments are required to be done internal to the camera, requiring manual intervention at the camera in its installed position. A few companies have provided tilt and pan control multiplexed onto the coaxial video cable utilizing proprietary techniques, but these have not been popular due to the proprietary nature of the method.

Remote control of auxiliary functions become an even more daunting task if the system has to be wireless. All of these various signals then need to combined for transmission and split after reception.

Because of the inherent limitations in the various closed circuit television systems now available, other media have been employed to perform security monitoring over wider areas. This is done with the use of compressors and decompressors used to reduce the bandwidth. Examples include sending compressed video over standard voice bandwidth telephone circuits, or more sophisticated digital telephonic circuits such as frame relay or ISDN circuits and the like. While commonly available and relatively low in cost, each of these circuits is of narrow bandwidth and incapable of carrying "raw" video data such as that produced by a full motion video camera, using rudimentary compression schemes to reduce the amount of data transmitted. As previously discussed, full motion video is typically 2 to 6 megahertz in bandwidth while typical low cost voice data circuits are 3 kilohertz in bandwidth.

There are known techniques for facilitating "full motion" video over common telecommunication circuits. The video teleconferencing (VTC) standards currently in use are: Narrow Band VTC (H.320); Low Bitrate (H.324); ISO-Ethernet (H.322); Ethernet VTC (H.323); ATM VTC (H.321); High Resolution ATM VTC (H.310). Each of these standards has certain advantages and disadvantages depending upon the volume of data, required resolution and costs targets for the system. These are commonly used for video teleconferencing and are being performed at typical rates of 128K, 256K, 384K or 1.544M bit for industrial/commercial use. Internet teleconferencing traditionally is at much lower rates and at a correspondingly lower quality. Internet VTC may be accomplished at 33.6 KBPS over dial-up modems, for example, but is of low quality. Video teleconferencing is based on video compression, such as the techniques set forth by CCITT/ISO standards, Internet standards, and proprietary standards. Other, sometimes proprietary, schemes using motion wavelet or motion JPEG compression techniques and the like are also in existence, and MPEG is utilized for high quality video compression. These techniques are not commonly utilized for video conferencing. There are a number of video teleconferencing and video telephone products available for transmitting "full motion" (near real-time) video over these circuits such as, by way of example, systems available from AT&T and Panasonic. While such devices are useful for their intended purpose, they typically are limited in the amount of data which may be accumulated and/or transmitted because they do not rely on or have limited compression. There are also devices that transmit "live" or in near real-time over the Internet, such as QuickCam2 from Connectix, CU-See-Me and Intel products utilizing the parallel printer port, USB port, Firewire port, ISA, PCI card, or PCMCIA card on a laptop computer. Many of these are personal communications systems and do not have the resolution, the refresh rate required or the security required to provide for good surveillance systems. NetMeeting from Microsoft and Proshare software packages from Intel also provide low quality personal image distribution over the Internet.

All of the current low-cost network products have the ability to transmit motion or "live" video. However, such products are limited or difficult, if not impossible, to use for security applications because the resolution and refresh rate (frame rate) of the compressed motion video is necessarily low because of limited resolution of the original sample and the applications of significant levels of video compression to allow use of the low bandwidth circuits. The low resolution of these images will not allow positive identification of persons at any suitable distance from the camera for example. The low resolution would not allow the reading of an automobile tag in another example.

As these devices, particularly digital video cameras and encoders, come in more widespread use within a system, the amount of bandwidth required to transmit continuous, "live" images from an array of cameras is staggering. This is an even greater problem when retrofitting current facilities where it is desired to use current wiring or to incorporate wireless networking techniques. Even where the conduits are of sufficient capacity to handle the data load, storage and retrieval becomes an enormous task. It is, therefore, desirable to provide a system capable of maximizing the information available via a security system while at the same time minimizing transmission and storage requirements.

None of the prior art systems permit structured and controlled notification based on the identification of events as they occur. Even those that do permit some limited notification, for example, alarm systems sending a telephone signal to a monitoring station, do not provide detailed event information. Such systems are more global in configuration, simply sending a notification that an event has occurred at a monitored facility.

With terrorism and sabotage an increasing problem there is significant need to develop an integrated system capable of providing good physical/visual and/or audio surveillance as well as monitoring of the environmental, security and motion conditions of an aircraft, buses, trains, other commercial transports and response vehicles in order to obtain good real-time information of an event as it occurs, and for providing comprehensive information to a variety of response vehicles and personnel to better assist in the real-time response efforts The system of the subject invention would provide onboard and remote monitoring and reconstruction of events in such areas. The system would also permit the recording of visual information to provide a history for later review, providing yet another source of information for increasing the overall security. The system also provides real-time transmission of information to remote vehicles and personnel, and allows those vehicles to select and process information remotely.

While such a system would be of great benefit to the commercial transport and airline, security and law enforcement and emergency response industries in general and to the commercial airlines in particular, there is not an integrated system currently available adequately meeting these needs.

SUMMARY OF THE INVENTION

There are three main aspects to the invention: (1) the system is adapted for monitoring an aircraft or other vehicle while in route or in flight, for collection and relay of situational awareness data relating to onboard conditions and, where desired, performance and structural data; (2) the system is adapted for monitoring situational awareness relating to the aircraft or other vehicle while in port, including conditions in the terminal or port environment; and (3) the system supplies the data to local and remote monitoring stations via both wired and wireless links, permitting access of the information by permanent monitoring stations as well as mobile units including response vehicles, intercept vehicles and handheld units for roving personnel.

It is an important aspect of this invention that roving personnel, including personnel on the transport while in route such as an Air Marshal on aircraft or the like, can have access to this data using common and inconspicuous devices, such as a laptop computer or PDA or equivalent device, equipped with a wireless data transceiver. The Air Marshal can have video, data and voice communications utilizing a standard wired or wireless earphone/microphone unit in connection with the laptop computer, PDA or equivalent.

It is also an important part of this invention that transport crew members are provided with wireless "panic buttons" that may be utilized to activate the system and indicate emergency conditions.

The system also allows collection of situational awareness data to be collected from response vehicles, such as police cars and intercept aircraft and boats, and transmission of the information by permanent monitoring stations as well as other mobile units including other response vehicles, intercept vehicles and handheld units for roving personnel. This aspect of the invention can be utilized in combination with other elements of the invention, or in a stand-alone application such as recording and/or relaying a police response to a call or recording and/or relaying apprehension of a subject.

In the broadest aspect of the invention, the transport vehicle will include a plurality of strategically placed cameras and sensors for collecting the information, a hardened storage device onboard, such as a "black box" data recorder, panic buttons worn by or accessible by the crew to initiate transmission and transmitting means for transmitting information to remote stations as well as to the control center or cockpit on the vehicle via both wired and wireless networks. In the case of airborne transports, this will provide an air-to-ground link to remote stations such as an FAA center, to intercept vehicles, to the port or terminal and to mobile support units such as ground response vehicles.

The terminal system includes ground surveillance cameras and sensors to monitor the conditions of not only the vehicle while in port but also the conditions in and around the terminal. A server is provided for recording ground data and downloaded vehicle data from the transport or the response vehicles for archival purposes. Data from hand-held response personnel devices can also be archived. Typically, one of the ground or permanent monitoring stations will be located at the terminal complex. The terminal center will include wireless transmission equipment for transmitting and receiving data to and from the vehicle, to and from the response vehicles and personnel, and to and from the various ground based remote stations, including a network connection to relay data from the vehicle to response and intercept vehicles and personnel.

The monitoring stations will be stationary or permanent as well as mobile. The primary permanent station, in the case of airborne transport vehicles, may be an FAA center or similar command center with wireless link to the vehicle or transport via INMARSAT or other carrier as described herein. The station will include a server for storing and managing any data transmitted by the vehicle or transport. It will match the data with maps, vehicle design plans and real time sensor data and onboard conditions. Typically the main monitoring station or control center station will include a network connection for relaying the down-linked information to the various other mobile and fixed monitoring stations. In the preferred embodiment of the invention, mobile monitoring stations are included. These will include response vehicles, intercept vehicles, handheld units suitable for roving personnel and onboard personnel such as air marshals.

The subject invention is specifically directed to data generation, collection and selective transmission of critical data generated by monitoring equipment onboard an aircraft or other commercial transport and for selectively displaying the data on a cockpit display console as well as for downloading, transmitting and displaying data at external monitoring and response stations, including fixed ground stations, roving ground stations and chase aircraft or vehicles. The system of the subject invention is specifically adapted for monitoring an aircraft or other vehicle while in transit, in port or on the ground, and at the gate or dock.

The system of the subject invention also incorporates features for personnel in the response centers, vehicles or with portable response equipment, to select and control sensors as well as receive sensor data. This enables response personnel to "look around" within the transports or control unmanned sensor sites while the personnel are in a remote location.

Thus, the system of the subject invention is a sophisticated situational awareness system for identifying events as they unfold on a commercial transport, such as an aircraft, archiving the event, and providing real-time information to external resources for assessing the situation, for providing an appropriate response and for aiding in reconstruction of the event during a post event investigation. The system provides digital surveillance information collection, information processing system, automated dispatch, logging, and remote control and access. The system of the subject invention consists of intelligent sensors, servers, and monitor stations all interconnected by wired and wireless network connections both throughout the transport as well as externally over the localized transport's terminal and global communication networks. The system includes a variety of system appliances such as surveillance cameras, sensors and detectors and accommodates legacy equipment, as well. Traditional information is collected, analyzed, archived and distributed. This includes sensor data such as images, video, audio, temperature, contact closure and the like. New technology such as facial recognition and other biological recognition systems may also be readily incorporated. Visual signal identification looking for firearms and other weapons can likewise be incorporated. All of this information is digitized and distributed to archive, response and monitor stations where the information is analyzed for assessing appropriate responses and for dispatching the responses in a real time manner. Specifically, the processor analyzes the information and dispatches instructional data to the crew, as well as to appropriate response personnel, based upon events such as motion detection or a triggered sensor in a particular area in a particular time window when the system is "armed". Administrative and maintenance triggers may also be generated using the system of the invention.

In its preferred form, a plurality of sensor units, which may include at least one video or image sensor/device and/or at least one audio sensor and/or at least one motion sensor, are placed strategically about the area to be secured and, with respect to important assets such as a commercial transport, in and around the interior and exterior of the commercial transport, as well. In addition, strategically placed motion detectors, fire sensors, smoke sensors, door or latch sensors and other monitoring equipment are incorporated in the system. A comprehensive system incorporating these various sensing devices provides a broad based multi-media safety, security and surveillance system for monitoring an area or an asset at any time. Within the commercial transport, the system may be hardwired or may use wireless transmission and receiving systems. The wireless system is particularly useful for adapting the system as a retrofit on existing equipment and also provides assurances against disruption of data transmission during structural catastrophes such as fire or airframe breakup.

In the preferred embodiment, the wireless sensor system is fully self-contained with each sensor unit having an independent power supply and where appropriate, a sensor light source. The ground sensors may likewise be hardwired or use wireless transmission and receiving of video and/or alarm telemetry signals.

User interface devices are supplied on the transport, such as pilot displays and controls, crewmember "panic buttons" and the like. These devices are in communication with the system controller and provide system and event status when they are display devices, and provide control functions and trigger input when they are input devices. Examples of status and control units are the pilots MDU (Multifunction Display Unit). Examples of input devices are panic buttons located through the cabin and cockpit.

Wireless components also provide mobile connectivity to wearable user interface devices such as panic buttons. This allows triggering of the system by any crewmember from any location on the transport. Wireless connections, such as 802.11, provide a data link to a PDA or laptop units equipped with wireless radios. This is a highly valuable tool for Air Marshals or other security personnel allowing viewing of real time data in an inconspicuous manner from any location in the transport. Cameras can be selected remotely and viewed on the PDA or laptop. Historical data can be reviewed, giving the Air Marshal access to prior actions of the passengers giving a better profile of their intentions.

Wired or wireless panic buttons can be equipped with microphones and voice encoding hardware to convert spoken messages to digital data to be stored on the recording device, and/or transmit spoken messages to the cockpit, the hardened data recorder, relayed to the ground response stations, and to response personnel and vehicles. With this a crewmember not only can initiate an alert, they may transcribe and send a verbal description of the event. In addition, the wired or wireless device can be equipped with an earphone and voice decoding. A crewmember can then be sent voice such as from the captain or a ground response station. Utilizing both a microphone encoder and earphone decoder, wireless such as wireless IP can be utilized to have a two-way conversation between the crew member and the cockpit crew, or between the crew member and a ground or airborne response station.

My following earlier patents and pending applications are incorporated herein by reference:

1 Ser. No. 08/738,487 Filing Date: Oct. 28, 1996 U.S. Pat. No. 5,798,458 Issue Date: Aug. 25, 1998
  Title: Acoustic Catastrophic Event Detection and Data Capture and Retrieval System for Aircraft
2 Ser. No. 08/745,536 Filing Date: Nov. 12, 1996 U.S. Pat. No. 6,009,356 Issue Date: Dec. 28, 1999
  Title: Wireless Transducer Data Capture and Retrieval System for Aircraft
3 Ser. No. 08/815,026 Filing Date: Mar. 14, 1997 U.S. Pat. No. 5,943,140 Issue Date: Aug. 24, 1999
  Title: Method and Apparatus for Sending and Receiving Facsimile Transmissions Over a Non-Telephonic Transmission System
4 Ser. No. 09/143,232 Filing Date: Aug. 28, 1998
  Title: Multifunctional Remote Control System for Audio Recording, Capture, Transmission and Playback of Full Motion and Still Images
5 Ser. No. 09/257,448 Filing Date: Feb. 25, 1999
  Title: Multi-Casting Communication Protocols for Simultaneous Transmission to Multiple Stations
6 Ser. No. 09/257,720 Filing Date: Feb. 25, 1999 U.S. Pat. No. 6,392,692 Issue Date: May 21, 2002
  Title: Network Communication Techniques for Security Surveillance and Safety System
7 Ser. No. 09/257,765 Filing Date: Feb. 25, 1999 U.S. Pat. No. 6,366,311 Issue Date: Apr. 2, 2002
  Title: Record and Playback System for Aircraft
8 Ser. No. 09/257,767 Filing Date: Feb. 25, 1999 U.S. Pat. No. 6,246,320 Issue Date: Jun. 12, 2001
  Title: Ground Link With On-Board Security Surveillance System for Aircraft and Other Commercial Vehicles
9 Ser. No. 09/257,769 Filing Date: Feb. 25, 1999
  Title: Ground Based Security Surveillance System for Aircraft and Other Commercial Vehicles
10 Ser. No. 09/257,802 Filing Date: Feb. 25, 1999 Pat. No. 6,253,064 Issue Date: Jun. 26, 2001
  Title: Terminal Based Traffic Management and Security Surveillance System for Aircraft and Other Commercial Vehicles
11 Ser. No. 09/593,901 Filing Date: Jun. 14, 2000
  Title: Dual Mode Camera
12 Ser. No. 09/594,041 Filing Date: Jun. 14, 2000
  Title: Multimedia Surveillance and Monitoring System Including Network Configuration
13 Ser. No. 09/687,713 Filing Date: Oct. 13, 2000
  Title: Apparatus and Method of Collecting and Distributing Event Data to Strategic Security
14 Ser. No. 09/966,130 Filing Date: Sep. 21, 2001
  Title: Multimedia Network Appliances for Security and Surveillance Applications
15 Ser. No. 09/974,337 Filing Date: Oct. 10, 2001
  Title: Networked Personal Security System
16 Ser. No. 09/715,783 Filing Date: Nov. 17, 2000
  Title: Multiple Video Display Configurations and Bandwidth Conservation Scheme for Transmitting Video Over a Network
17 Ser. No. 09/716,141 Filing Date: Nov. 17, 2000
  Title: Method and Apparatus for Distributing Digitized Streaming Video Over a Network
18 Ser. No. 09/725,368 Filing Date: Nov. 29, 2000

Title: Multiple Video Display Configurations and Remote Control of Multiple Video Signals Transmitted to a Monitoring Station Over a Network
19 Ser. No. 09/853,274 Filing Date: May 11, 2001
Title: Method and Apparatus for Collecting, Sending, Archiving and Retrieving Motion Video and Still Images and Notification of Detected Events
20 Ser. No. 09/854,033 Filing Date: May 11, 2001
Title: Portable, Wireless Monitoring and Control Station for Use in Connection With a Multi-Media Surveillance System Having Enhanced Notification Functions
21 Ser. No. 09/866,984 Filing Date: May 29, 2001
Title: Modular Sensor Array
22 Ser. No. 09/960,126 Filing Date: Sep. 21, 2001
Title: Method and Apparatus for Interconnectivity Between Legacy Security Systems and Networked Multimedia Security Surveillance System
23 Ser. No. 10/134,413 Filing Date: Mar. 29, 2002
Title: Method for Accessing and Controlling a Remote Camera in a Networked System With Multiple User Support Capability and Integration to Other Sensor Systems The ground or terminal security system may include motion sensitive, weight sensitive, infrared sensitive, audio sensitive, RF sensitive, metallic sensitive, chemical sensitive, x-ray sensitive or other type activation system so that the equipment is not activated until some event is detected, i.e., the system is proximity or action triggered. The ground communications link, monitoring and/or recording systems for collecting and/or transmitting the data is disclosed in my copending applications may be adapted for processing the information gathered by the on-ground security system. The wireless system may use radio frequency transmission and may incorporate the wireless communication system already in place as an integral component of the system. Where desired, a wireless local area network (LAN) or other wireless system may also be utilized for intercommunication among the system components. Preferably, the entire capture, retrieval, monitor and archive system is installed utilizing the wireless transmitting/receiving system and power backup techniques in order to assure that transmission will not be lost in the event of a power shutdown or a failure causing possible open or shorted circuit conditions which could occur in a hard wired system.

The subject invention is an improvement over and expansion of this concept and adds ground security and surveillance, as well as incorporating the onboard systems of the aforementioned patent and applications. It is an important feature of the invention that the transmitting network provides a comprehensive communications link between stationary and mobile stations on the ground, as well as between these stations and the asset or area being monitored, both to and from strategic sensors onboard the commercial transport and on the ground. In the preferred embodiment of the invention, a wireless LAN (local area network), WAN (wide area network) or other wireless transmission scheme is used as the transmission system of choice. A digital wireless voice intercom is provided for security purposes and for communication between the onboard crew and the ground-based personnel. In the preferred embodiment, a video intercom is also provided.

In its broadest sense, the subject invention is directed to a method for identifying the occurrence of an event at a remote location either on the transport or in the terminal area, qualifying the event as to its type, prioritizing the event, and then, based on the qualification and the priority, forwarding the event to selected stations on a network. Basically, the location, type and priority of event are "tagged" at the point where a sensor picks up the event and event data is then forwarded only to selected stations on the network as required by a qualification system and a priority hierarchy. This permits a large amount of data to be collected at the site of a sensor while minimizing transmission of the data to an "as-needed" basis, reducing the overall bandwidth requirements of the system and focusing the notification to the specific individuals or organizations that need to be involved. As an example, while periodic data may be gathered at a sensor, only data indicating a change in condition will be transmitted to various monitoring stations. In addition, monitoring stations are selected based on pre-established hierarchy, typically managed by a system server.

One aspect of the invention provides for continuous or selective monitoring of a scene with live video to detect any change in the scene while minimizing the amount of data that has to be transmitted from the camera to the monitoring station and while at the same time maximizing storage, search and retrieval capabilities. Another aspect of the invention is a method of event notification whereby detected events from the transport, the transport crew, or the terminal of the transport from sensors, sensor appliances, video appliances, legacy security alarm systems and the like are processed and a comprehensive and flexible method of notifying individuals and organizations is provided using a plurality of methods, such as dial up telephones, cellular and wireless telephones, pagers, e-mail to computers, digital pagers, cellular phones, wireless PDA's, and other wireless devices, and direct network notification to workstations based on I/P addressing to workstations, digital pagers, digital cellular phones, wireless PDA's and other network and wireless devices. The preferred embodiments of the invention are directed to a method for collecting, selecting and transmitting selected scene data available at a camera on the transport, the transport crew, or the terminal of the transport to a remote location, including collecting the image data on a preselected basis at the camera and defining and transmitting an original scene to the remote location. Subsequent data of the scene is compared to the data representing the scene in its original state. Only subsequent data representing a change in the original scene is transmitted. Each transmitted data scene may be tagged with unique identifying data. Each transmitted scene may be analyzed with automated techniques, such as facial recognition processing or automated object detection. The transmitted data is stored for archival, search and retrieval. The selection scheme of the invention also permits notification of the detected events to be sent via a network to selected monitoring stations.

The system of the subject invention utilizes cameras and sensors with a wide range of versatility, beginning with normal default modes that make the system fully operational and including programmable modes for customizing the system to the specific application. Programmable modes include: (1) Video motion detection with parameters configurable by a remote user; (2) Video motion detection configurable by a remote user to select areas of interest or disinterest in the video scene; and (3) Video motion detection used to trigger generation, storage, or transmission of compressed digital images, 4) Video "speed" detection used to identify people who are moving at unusually high speeds used to generate notification events, 5) Video scene change analysis used to generated triggers, 6) Video scene processing used to identify objects or items that are potentially dangerous, and 7) Video scene processing for identification, such as facial recognition.

The system of the subject invention includes the capability of associating motion data from a video image with compressed digital images, using an improved method for transmitting a succession of compressed digital still images or a full motion video stream from a live source to an image database server. A network-based server is provided for archiving and retrieving compressed digital image files from a plurality of live sources through an efficient and rapid means for uniquely identifying compressed digital image files sent to a system server. An improved means for storing compressed image files on a removable mass storage system is also disclosed. One or more multimedia formats, in any combination, can be stored on the server, such as high resolution still JPEG or wavelet images, full motion SIF images, full motion Q-SIF images, audio, or the like.

The graphical user interface is user-friendly and provides for convenient and efficient browsing through a situational awareness file database, and for efficiently selecting files there from.

The subject invention is directed to several distinct aspects of image data collection and retrieval, namely: (1) motion and object detection, (2) legacy sensor and alarm data importation, (3) event filtering to qualify alarm and supervisory events, (4) notification, (5) data archiving and retrieval, and (6) user interface technology.

The invention recognizes the need for the camera or video encoder appliance to capture, compress and transmit the image on-site. Without proper compression the amount of data to be transmitted soon overwhelms even the largest capacity systems. In the subject invention, while continuous data is captured, it is recognized that only changes in data need to be transmitted. Specifically, only when a scene changes from the previous captured image is it required that the image be transmitted to a remote monitoring station, and more importantly, stored on the archive database. Thus, while images may be taken at close intervals or even as streaming video, if there is not any discernible change in the image data from the original image and the subsequent images, the data is not required to be transmitted.

Once collected, the application software determines how the associated image and other sensor data, such as sound, is processed and transmitted by the system. Other types of simultaneous event detection can also be activated in the sensor/camera such as acoustic (gunshot or explosion) detection, temperature detection, and the like.

In the preferred embodiment, all of the transmitted data is entered into an onboard data recorder in a 60 minute "loop", two hour loop or the like. When a response-triggering event occurs, the data is then transmitted live to remote or ground stations for assessment and response. The archived data stored onboard is useful in determining the events leading up to the triggering event.

The remote system is a multimedia situational archival server and is typically located on a network at a central management location. The server stores the transmitted data on a disk drive and optionally on a back-up tape drive or other very large storage array device such robotic tape, optical or high-density disk storage. As each data event, image or frame is received, it is filed with a unique identifier comprising date, time, camera or encoder and/or file information. This allows full search capability by date, time, event, user, and/or camera on command, greatly enhancing retrieval and reconstruction of events. From an operation perspective, a key aspect of the invention is the graphical user interface as typically displayed on an interactive monitor screen such as, by way of example, a CRT located at a remote monitoring station or an LCD on a wireless portable PDA based monitoring station. This permits the user to search or browse the images in the database and to perform automated searches through the archive for events of interest. In the preferred embodiment, the user interface includes a map of the areas covered by the system and current live images from selected cameras. On screen controls are provided for selecting, controlling and adjusting cameras. The screen also contains a series of controls used for searching and browsing. The time, date, and type of events are displayed. The user may scan forward and backward from an image, event, or time, and may select another camera to determine the image at the same time and date. In an enhanced system of the preferred embodiment, the selected camera will flash on the map. Also, the location of an event will also flash on the map, when detected by a video event from a camera, or when detected with another sensor or appliance, such as a legacy alarm system or an advanced network appliance.

In the preferred embodiment it may be desirable to have the system to automatically switch to real time display of cameras detecting an unexpected change in motion, unexpected high rate of motion, or during detection of objects or persons that require investigation. Specifically, as a camera begins transmission to the server, the display screen will be activated to show the image.

In the preferred embodiment it may also be desirable to have the system automatically switch to the real time display of cameras that are associated with other types of sensors, such as legacy alarm system motion detectors or door contacts or activation of a panic button that are in or adjacent to the field of view of a particular camera or group of cameras.

The subject invention supports data generation, transmission and collection of critical data generated by monitoring equipment onboard an aircraft or other commercial transport and for selectively displaying the data on a cockpit display console as well as for downloading, transmitting and displaying data at external monitoring and response stations, including fixed ground stations, roving ground stations and chase aircraft or vehicles In its preferred form, the system is wireless, with each component communication with wireless LAN (WLAN) or a wireless WAN (WWAN). Each component can also includes an independent power supply that can energize operation even when the system begins to break apart.

In its preferred form, a plurality of sensor units are placed strategically throughout the aircraft or other commercial transport. The data sensors/transducers, such as, by way of example, cameras, engine management sensors, panic buttons, pressure or course change sensors and the like generate critical data which is transmitted to the cockpit display and to one or more onboard recorders. On command, or in response to certain types of events, real time data is capable of being transmitted to remote stations either fixed on the ground or mobile on the ground or in the air, permitting monitoring of events as they occur and permitting formulation of appropriate responses.

In the preferred embodiment of the invention, multiple cameras are located in the cabin, cargo bay and cockpit of the aircraft, with additional cameras being located for monitoring the tail section, landing gear and other strategic components. The data from these cameras is routinely stored on a hardened recorder located in the aircraft. Upon command, the data may be sent in a live, real time format to off board stations. In the preferred embodiment the crewmembers are provided with panic buttons to trigger alarm and notification events. Panic buttons may also be strategically installed in fixed locations throughout the aircraft. Other events may also trigger transmission of live video to the ground, including, but not limited to change in course inconsistent with the flight plan, change in cabin pressure, drop in altitude, extreme motions of control surfaces, detection of aircraft system failures, detection of a loud noise within the airframe, failure to respond to radio request, and the like.

Panic buttons data transmissions will include a code identifying the person that the panic button was issued to. The fixed location panic buttons will include a location or address code in their signal, permitting ground personnel to determine the exact location in the aircraft where the event was triggered. Wideband RF "chirp" technology as well as other schemes can be utilized to geo-locate wireless panic buttons.

All panic buttons may also include an LED or other display confirming receipt of the distress signal by off board personnel. In the preferred embodiment, the call confirmation is "closed loop", i.e., to the panic button controller to ensure that the signal is sent and delivered and to the operator at the ground station. The panic button can be configured to send multiple types of distress signals such as fire, medical or aircraft in distress signals.

Other types of events can trigger automatic transmission of onboard data, such as an off course maneuver, abrupt change in altitude, abrupt change in speed, steep angle of bank or attack, extreme high or low airspeed and the like, stall detection, or sensor indicated changes in management sensors such as rudder or aileron position and change, activation of landing gear and the like, change in hydraulic pressure and the like. Various alarm sensors such as fire, smoke, presence of gas or fumes, and the like may also be employed.

An onboard data recorder is provided and is adapted for recording analog and/or digital cameras placed throughout the aircraft. When analog cameras are employed, the analog signal is converted to digital with compression and is adapted for providing signals in the form of high resolution periodic stills such as JPEG or wavelet, and/or compressed motion such as MPEG-1, MPEG-2, MPEG-4 or future motion wavelet algorithms. The events may be recorded in parallel with video or images and include a time code. Audio and aircraft status data may be time matched and recorded with the video. A flight data recorder configured for full multimedia capability of data, audio and video can be a full replacement for the legacy flight data recorders and cockpit voice recorders in place today.

In the preferred embodiment of the invention, the data recorder is an IP recorder (Internet Protocol), with a hardened hermetic enclosure meeting current FAA regulation with an impact strength of 3400 Gs, 6.5 mS, crush specification approved with a fire resistance of 110.degree. C. for 30 minutes and meeting all underwater performance requirements, including an underwater locator beacon powered by a Lithium or other suitable battery with the required shelf life. Typically, the recording time will be a thirty minute loop or longer.

The recorder is adapted for recording any IP data, including but not limited to encoded video from the cockpit video, radar, MDF and the like, as well as surveillance camera video, encoded audio such as radio receptions into the aircraft, automated flight systems and alarms, open microphones throughout the aircraft and in the cockpit, encoded aircraft instrumentation data such as ARINC-429 formatted data, analog and discrete inputs and the like, and aircraft bus data such as ARINC-573, ARINC-717 and the like. Crew key pushes into MCDU or MIDU devices can also be recorded by collecting ARINC-739 data from the MCDU or MIDU, or other user interface devices utilizing the appropriate bus interface.

Multiple data types are contemplated in addition to the write over loop at periodic increments, such as flight perishable data to be written over on each flight, e.g., take-off time, climb data, fuel consumption, landing time, engine performance data and the like, and long term data such as engine hours, number of take-offs and the like.

Access to the data may be controlled based on need to know and data type through access protection using encryption, password protection, physical port requirements from a least secure wireless to medium wired access to high security encryption and controlled port access. Multiple access authority levels may be provided. As an example, recorded cockpit video and cockpit audio may be protected such that playback or streaming access cannot routinely be accomplished while the aircraft is in the sky or on the ground. Only authorized access during or after an emergency situation would be allowed, and the access and decryption keys would be protected by doctrine and procedure.

It is an important feature of the subject is that it is part of an integrated network with full functional gateways to a remote hub and server for collecting and managing the information as well as for receiving control data from the remote station. There may also be an onboard local sever for managing onboard information, preferably as an integral part of the data recorder. The onboard server will typically include hardened electronics having a memory, an underwater locator and remote power. Hardening is useful to protect the data if there is an airplane crash or if an lake, river or ocean-going vessel sinks. Electronics associated with the server may be hardened or un-hardened, such as the LAN hardware (hub, NIC, wireless access point, DCHP server, and protocol converters). The server will include memory storing system software, memory storing server operating system, a power supply and monitoring, environmental monitoring and an optional backup battery power supply source to allow the server to continue operation during transport power failure. The IP connections allow for easy data redundancy where multiple (nose/tail) recorders may be utilized.

Preferably, data recorder redundancy will be provided. Specifically, the subject invention permits and enhances redundancy by utilizing IP connections for easy data redundancy, where multiple (2 or more) recorders are connected via hub and may be located in the tail and the nose or other desired locations in the aircraft. Data transmission to multiple servers can be easily accomplished in a networked sever configuration. The data that is being recorded can be multi-cast to one, two or more servers without increasing the data bandwidth on the local network.

The ground support network is a WAN (Wide Area Network), IP based, and utilizes COTS Comms Networks for supporting multiple centers such as FAA and airline operations as well as security stations. The transport-to-ground support network connection utilizes a plurality of available RF communications channels and methods. The system of the subject invention supports prioritization of messaging by assigning communication channel based on importance using high priority for emergency communications, utilizing highly reliable, widespread communication channels such as HF, GLOBALink/HF, VHF, GLOBALink/VHF, SATCOM, GLOBALink/Satellite (Aero H and Aero I) and the like. Emergency high priority backup may be via special cellular such as, by way of example, AirCell.

For extreme emergencies such as in an intercept condition where, in the case of aircraft, high speed intercept aircraft such as the F-16 are dispatched, or in the case of an ocean-going vessel, a high-speed Coast Guard Boat is dispatched, a high bandwidth wireless LAN may be used. The transport would have an on-board Access Point or Bridge unit, as would the intercept aircraft or ship. A wireless LAN or modified wireless LAN 802.11 may be used for this purpose. It is suggested that unique and Government/Transportation frequencies be assigned to this important function to prevent interference between commercial users and Government/Transportation use.

Additional intercept vehicle communications options using medium bandwidth (typically 16 kbps) include MIL radio links using UHF, UHF-SATCOM, VHF Aircraft and various radio channels (e.g., AN/ARC-182, AN/ARC-210). These systems are currently utilized in the majority of the military intercept aircraft and could be readily utilized. However, it would not be desirable to outfit commercial aircraft with Type-1 encryption devices that the military utilized to secure communications due to the "top-secret" security overhead of these devices. The transport surveillance system can therefore utilize non-encrypted communications, or utilize various alternate commercial encryption devices such as DES, triple DES and the like. Commercial protocols may also be used permitting connection to military radio without typical use of TYPE-1 military encryption devices. Some of the US fleet of military aircraft and military ships at sea that might be utilized in threatened transport intercept operations are currently outfitted with image reception equipment such as the PhotoTelesis Corporation model FTI (Fast Tactical Imagery) equipment or AIR-RIT (Aircraft Remote Image Transceiver) equipment. These units are currently deployed utilizing military protocols and encryption.

Minor modifications to allow communications with commercial encryption and communications to the commercial airlines allows simple and economical reception of transport video directly into these aircraft. The aircraft can then relay the images utilizing standard military SATCOM (TACSAT) for over the horizon communications, line-of-sight radio, or other method to a military operations center for further analysis and dissemination.

For medium priority that is utilized for real time surveillance, image transmission, streaming video transmissions, a higher bandwidth (typically 64 kbps and above) is required. Typical communications channels include Aero H+, Inmarsat 3, Iridium, and newer flight entertainment services, such as: Connexion by Boeing, Inmarsat and Airia, In Flight Network by Rockwell Collins/News Corporation/Globalstar, Thomson, CSF Sextant and Astrium, Flight Connect by Tenzing, InFlight Mail by Honeywell/Seattle Labs, Inflilightonline.com, LiveTV, GTE, ATT, Aircel, AirTV, ICO Global/Teledesic, and ARINC. Lower priority channels may be used, for example, for non-real time downloads such as aircraft performance data, aircraft operational data and archival surveillance data.

The system greatly enhances post event reconstruction including catastrophic airframe investigations. While prior art wired cameras generally stop functioning upon breakup due to mechanical failures, electric failures and the like, the wireless cameras with independent power supply provide substantial immunity to these events. Data can be collected both before and during unfolding catastrophic events, even if they involve fire, airframe failure, and the like.

It is, therefore, an object and feature of the subject invention to provide a comprehensive multimedia security and surveillance system for an aircraft while in flight, on the ground and at the gate.

It is a further object and feature of the subject invention to provide a comprehensive, multimedia security and surveillance system suitable for use by other commercial transports or vessels while in transit, in port and at the gate or dock.

It is another object and feature of the subject invention to "bond" the transport's on-board sensors, including the multimedia security and surveillance system, to a ground based multimedia security and surveillance system while "docked" at the port, either by wired or wireless connection.

It is a further object and feature of the subject invention to utilized the transport's on-board sensors, including the multimedia security and surveillance system for detection of and communication of "alarm" conditions such as intrusion, loud noises, fire and the like.

It is another object and feature of the invention to provide a means and method for collecting event data at a remote location such as an aircraft, identifying and prioritizing the data, and selectively transmitting the data to selective monitoring stations on a network based and on an event prioritization hierarchy.

It is a further object and feature of the invention to provide an automatic information display on the ground that indicates when an event has been received from a transport. That information may include, transport type, identification (such as tail number or airline and flight number in the case of an airliner), location, emergency type, other emergency data, other transport navigation data such as speed, direction, or the like, relayed voice data, and the like.

It is another object and feature of the invention to permit the monitoring, storing and retrieval of any of a variety of video, images, audio signals and/or performance data by the tracking, surveillance and/or imaging equipment onboard an aircraft or other commercial transport.

It is an object and feature of this invention to store the variety of video, images, audio signals and/or performance data by the tracking, surveillance and/or imaging equipment onboard an aircraft or other commercial transport on an on-board server.

It is a further object and feature of the invention that the on-board server be accessed locally on the transport or remotely, including over wireless means.

It is also an object and feature of the invention that the server be hardened to protect recorded situational awareness data from damage from a catastrophic event such as a fire, crash, sinking, or other such calamity.

It is an object and feature of this invention to allow recording of down-linked streams in lower resolution by a monitor station, then play back the stored video in fast, normal, or slow motion, and to pause the video on frames of interest.

It is an object and feature of the invention to allow printing of frames that are of interest.

It is an object and feature of the invention to allow e-mailing of frames that are of interest.

It is an important object and feature of this invention to allow record lower resolution real-time down-linked streams on the monitor station, then play back the stream forward and backwards, slow and fast, to find a frame or series of frames that are of particular interest, then command the system to download from the aircraft to the monitor terminal the high-resolution still or stills that correspond to the selected frame or frames of the low resolution stream. This allows preservation of bandwidth for the down-linking of real-time full-motion video, yet allows selection of and transmission of high resolution images that correlate to selected moments in the down-linked low resolution full motion stream.

It is an object and feature of this invention to facilitate recording, on the local monitor workstation or on a system server, all down-linked streamed or recalled historical data on the monitor or server storage media. This facilitates preservation and possibility of further processing and analysis of this data if the aircraft database is lost or destroyed by a catastrophic event.

It is a further object and feature of the invention to provide a means and method for comparing data generated at a remote location to determine the occurrence of an event and to transmit the data to a selective monitoring station indicating the occurrence of an event.

It is also an object and feature of the subject invention to provide a means and method for collecting video and/or still images of a scene and transmit any change in the scene in near real-time to a remote location.

It is another object and feature of the subject invention to provide a means and method for minimizing the amount of data to be transmitted without any loss of critical change data.

It is a further object and feature of this invention as a further method for reducing the amount of data to be transmitted, in one aspect of the invention the full motion data is transmitted in low resolution to ascertain the general nature of a situation and once determined to be of a predetermined priority, historic data may be downloaded from an onboard storage system in the form of high-resolution stills such as would be needed to establish the identity of a person or a specific make/model of a weapon.

It is another object and feature of the invention to provide a notification method whereby incidents may be prioritized.

It is an object and feature of the invention to categorize events in order to provide a notification method whereby notification of events can be made in a selective manner.

It is another object and feature of the invention to provide automated selection of notification of the nearest qualified personnel based upon the reported geo-location of potential qualified response personnel, such as may be determined by an associated GPS system, a personnel tracking system, proximity sensors, or any other automated fashion that is interfaced to the network that can report the locations of the personnel.

It is a further object and feature of the invention to provide a notification method whereby the recipients of the notification may be password encoded as defined by the type of incident.

It is an object and feature of the invention to provide a convenient user interface to configure tables of individuals and organizations to be notified along with the techniques used for notification of that individual or organization.

It is an object and feature of the invention to provide confirmation of delivery of a message concerning the event.

It is also an object and feature of the invention to provide a means and method for selecting stations on a network for receiving event data based on a prioritization of event data.

It is also an object and feature of the invention to provide a means and method for selecting stations on a network for receiving event data based on the type of event data.

It is also an object and feature of this invention to provide for monitoring situational conditions of and surrounding the transport both while in port and while in route.

It is yet another object and feature of this invention to provide means for archiving performance parameters for later recall in order to review performance and/or reconstruct events.

It is an additional object and feature of this invention to provide a ground surveillance and security system for detecting the breach of commercial transport security while the commercial transport is on the ground or in a port or terminal and is unattended.

It is another object and feature of the subject invention to identify that a commercial transport is on the ground and needs to be monitored for tracking its exact location and its orientation on the ramp.

It is also an object and feature of the subject invention to provide a security system, which is integral with the commercial transport for providing ground security.

It is yet another object and feature of the subject invention to provide apparatus for permitting ground and/or base personnel to receive video, images, audio information and/or data relating to critical components and areas of a commercial transport and operational data such as dispatch information.

It is an object and feature of this invention to have activation of the data transmission system, particularly the audio and/or video transmission activated by a "panic button" available to the crew.

It is an object and feature of this invention to have the "panic button" wireless and worn by the crewmembers.

It is an object and feature of this invention to have a "panic button" with an audio transmission and optionally audio reception capability by which a crewmember can describe the situation that is occurring in their presence.

It is an object and feature of this invention to identify the crewmember who initiated a "panic" call.

It is an object and feature of this invention to allow the crewmember to identify what kind of a "panic" condition exists, with button push data or audio data transmission.

It is an object and feature of this invention to block transmission of audio and/or video to ground stations unless the system has been activated by use of a "panic button" or by the automatic detection of other critical events. This is especially critical in "private" areas of the transport, such as the cockpit.

It is an object and feature of this invention to automatically detect and activate on critical airframe events such as engine failure, hydraulic failure, power failure, controls failure, and the like.

It is an object and feature of this invention to automatically detect and activate on departure from a predetermined flight plan.

It is an object and feature of this invention to allow change of a flight plan from the ground by up-linking. Security can be provided if the crew cannot change the flight plan.

It is an object and feature of this invention to automatically detect and activate on surveillance sensors, such as acoustic detection of a gunshot, explosion, screaming or loud mechanical noises, motion detection of personnel running, smoke detection, and the like.

It is an object and feature of this invention to allow password controlled activation of the surveillance system from ground terminals, ground vehicles, or intercept platforms in the air, on the ground or at sea.

It is an object and feature of this invention to allow, once the system is activated, switching of cameras that are being transmitted by the surveillance system from ground terminals, ground vehicles, or intercept platforms in the air, on the ground or at sea.

It is an object and feature of this invention to allow intercept or other commercial aircraft to operate as a repeater, relaying surveillance information to other intercept platforms in the air, on the ground or at sea.

It is an additional object and feature of the subject invention to provide a fully integrated, self-contained power supply system for powering the various components of the surveillance system in the event of an airframe structural failure and/or disruption in aircraft power.

It is yet another object and feature of the subject invention to provide a record of critical components and areas of an aircraft during flight for archival and retrieval purposes.

It is an object and feature of this invention to provide a wireless means for providing personnel, such as an Air Marshal, inconspicuous access to transport data such as video sensor data, audio data, transport status data, navigation information and any alarm condition data when they are on or near to the transport.

It is a further object and feature of this invention to provide the Air Marshal or other personnel access to this data using common and inconspicuous devices, such as a laptop computer or PDA or equivalent device, equipped with a wireless data transceiver. The Air Marshal can have voice communications utilizing a standard wired or wireless earphone/microphone unit in connection with the laptop computer, PDA or equivalent.

It is an object and feature of this invention to provide wireless PDA (Personal Data Assistant) or wireless laptop computers with the ability to select sensors to view sensor data, receive alarms, send messages including e-mails and the like from any seat on or any area of the transport, or any immediate area near to the transport if it is available, such as an aircraft on the ground.

It is an object and feature of this invention to provide a wireless PDA or equivalent device that is outfitted with a microphone that may be utilized for relaying by audio the situation that the crewmember is seeing unfold. This may utilize audio digitization and wireless IP connectivity.

It is an object and feature of this invention to provide a wireless PDA or equivalent device that is outfitted with an earphone that may be utilized for relaying by audio instructions to the crew member from the pilot, co-pilot, or ground and intercept personnel. This may utilize audio digitization and wireless IP connectivity.

It is an object and feature of this invention to prove a wireless PDA or equivalent device that is outfitted with a microphone and earphone such that two-way wireless communication can occur between crewmembers, including between the secured cockpit crew and the cabin crew, and between crew members and with the ground and intercept personnel. This may utilize audio digitization and wireless IP connectivity.

It is an object and feature of this invention to relay audio messages collected by a panic button, PDA, laptop computer with microphone or other such audio sensor to ground stations and intercept platforms during emergency conditions utilizing IP connectivity.

It is an object and feature of this invention to record all electronic audio communications among crew members, including that utilizing wireless laptop, PDA or equivalent devices, on the on-board server or hardened server.

It is an object and feature of this invention to provide access, including wireless access, to historical transport sensor data to personnel, such as the Air Marshal, for evaluation of past actions of passengers and crew to better determine their intent or for proving their actions.

It is an additional object and feature of the subject invention to provide means for permitting ground or pursuit personnel to receive data relating to critical components and areas of an aircraft during flight.

It is a further object and feature of the subject invention to provide real time data monitoring of various systems, components and conditions onboard an aircraft using wireless transmissions systems.

It is an object and feature of this invention to have a seamless transition from one monitor station to another, such as an aircraft in flight being monitored by the FAA center, landing and being monitored by Ground Control, and docked at the gate being monitored by an Airport Facility Security Team.

It is an object and feature of this invention to utilize a communications link between transports, such as airliners and ships, to intercept aircraft that have onboard tactical image transceivers such as are currently deployed.

It is an object and feature of this invention to utilize Internet Protocols, such as PPP and TCP-IP, to communicate transport identification, transport location, emergency event information, surveillance data, audio, video, transducer information, transport condition to ground terminals, ground vehicles, ships or intercept aircraft and provide remote control of the transport system from ground terminals, ground vehicles, ships or intercept aircraft.

It is an object and feature of this invention to communicate transport identification, transport location, emergency event information, surveillance data, audio, video, transducer information, transport condition to ground terminals, ground vehicles, ships or intercept aircraft and provide remote control of the transport system from ground terminals, ground vehicles, ships or intercept aircraft utilizing Inmarsat circuit switched carrier circuits.

It is an object and feature of this invention to communicate transport identification, transport location, emergency event information, surveillance data, audio, video, transducer information, transport condition to ground terminals, ground vehicles, ships or intercept aircraft and provide remote control of the transport system from ground terminals, ground vehicles, ships or intercept aircraft utilizing Inmarsat packet switched carrier circuits.

It is an object and feature of this invention to communicate transport identification, transport location, emergency event information, surveillance data, audio, video, transducer information, transport condition to ground terminals, ground vehicles, ships or intercept aircraft and provide remote control of the transport system from ground terminals, ground vehicles, ships or intercept aircraft utilizing wireless LAN connections, such as 802.11B. This is a wide bandwidth short range technology, and is particularly useful in establishing a connection while the transport is docked in port, moving in the portal area such as an airliner taxing on the ramp, or being intercepted such as an airliner being chased by an F-16 intercept aircraft in the air, or being followed by a SWAT team vehicle on the ground.

It is an object and feature of this invention to provide a communications processor that will disseminate the system data utilizing the appropriate communications circuit, such as for an airliner, utilizing Inmarsat, "Airphone" radio, and/or "Aircell" for communicating to ground terminals while in flight; 802.11B or VHF/UHF protocols for communication to dispatched military intercept aircraft while in "distressed" flight; 802.11B for communicating to ground resources while taxiing on the ground or parked at the terminal.

It is an object of this invention to allow the communications processor to activate one or more of the communications circuits at a time, based on the type and/or the priority of the event.

It is an object and feature of this invention to utilize multiple communications channels to support the security system.

It is an object and feature of this invention to use prioritization techniques to select the optimal channels that will be utilized for emergency response.

It is an object and feature of this invention to dynamically bond together two or more channels to increase the available bandwidth to deliver emergency information, such as by the use of an inverse multiplexer.

It is an object and function of this invention to provide event notification whereby detected events from sensors, sensor appliances, video appliances, legacy security alarm systems and the like are automatically processed and a comprehensive and flexible method of notifying individuals and organizations is provided using a plurality of methods, such as dial up telephones, cellular and wireless telephones, pagers, e-mail to computers, digital pagers, cellular phones, wireless PDA's, and other wireless devices, and direct network notification to workstations based on I/P addressing such as to workstations, digital pagers, digital cellular phones, wireless PDA's and other network and wireless devices.

Other objects and features of the subject invention will be readily apparent from the accompanying drawings and detailed description of the preferred embodiments.

BRIEF DESCRIPTION OF THE DRAWINGS

FIG. 10 is a schematic block diagram of a version of the data management module of the system of FIG. 9.

DESCRIPTION OF THE PREFERRED EMBODIMENT

Figure 1:
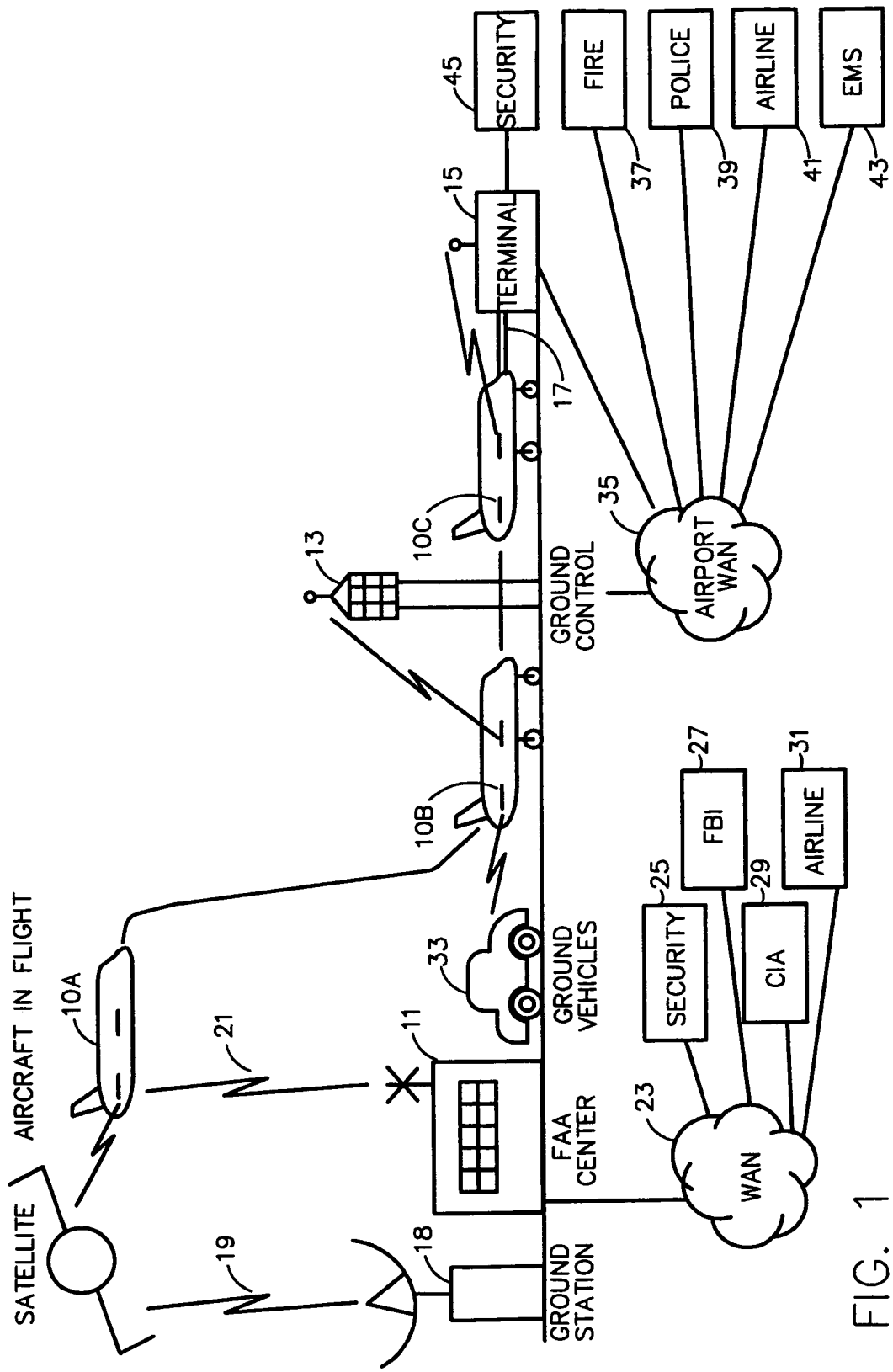
FIG. 1 is a diagrammatic view of a system for tracking and communicating to an aircraft while in flight, on the ground and at the gate.

The subject invention is specifically directed to a system for monitoring the conditions onboard a transport, such as an aircraft while in flight, as well as on the ground, and both while attended and unattended. The invention provides a unique method and apparatus for providing situational awareness aboard the transport, such as an aircraft, at any time and transmitting this information to any selected location, both onboard the aircraft and to remote locations. The remote receiving locations may be stationary or mobile and may be either ground or air based. While the invention is described in connection with aircraft and airports, it will be understood that the methods and apparatus of the subject invention are equally applicable to other forms of commercial and non-commercial vehicles and transports such as, by way of example, busses and bus stations, trains and train stations, boats and ports. The terms transport or "aircraft" as used herein can be replaced by "bus", "train", "truck", "boat" or any other commercial, police, fire, EMS, military, or international, federal, state or local government vehicle.

The subject invention is directed to a method for identifying the occurrence of an event at a remote location such as an aircraft, prioritizing the event, and then, based on the priority, forwarding the event to selected stations on a network. Basically, the location, type and priority of event are "tagged" at the point where a sensor picks up the event and event data is then forwarded only to selected stations on the network as required by a priority hierarchy. This permits a large amount of data to be collected at the site of a sensor while minimizing transmission of the data to an "as-needed" basis, reducing the overall bandwidth requirements of the system. As an example, while periodic data may be gathered at a sensor, only data indicating a change in condition will be transmitted to various monitoring stations. In addition, monitoring stations are selected based on pre-established hierarchy, typically managed by a system server. In addition, the data is stored onboard in a local recorder/memory and may be stored in a timed-loop, or an event based recycling mode. As a further method for reducing the amount of data to be transmitted, in one aspect of the invention the full motion data is transmitted in low resolution to ascertain the general nature of a situation and once determined to be of a predetermined priority, historic data may be downloaded from an onboard storage system in high-resolution stills that may be required to determine the specific identity of an individual, or the specific make/model of a weapon. Another method of accomplishing the desired data transmission reduction is to send short WaveBursts of lower resolution data to determine the situation and then revert back to high-resolution stills. Thus, at a monitor station personnel can see what is generally happening with full motion, then go to high resolution stills for absolute identification of individuals and events. WaveBurst sequences can also be done with a sequence of high-resolution stills for "step-motion" sequences of activity. It is important to note that WaveBurst operation is currently utilized by military aircraft such as the F-14 and F-16 that may be utilized for high speed intercept operations of "high-risk" civilian aircraft. This patent describes interoperability between the situational awareness systems installed on a commercial transport and the WaveBurst systems on military aircraft. This allows control of the situational awareness sensors from the military aircraft, and reception of images, WaveBurst sequences, and, with modifications, full motion video by the WaveBurst systems.

The system of the subject invention supports prioritization of messaging by assigning communication channels based on importance using high priority for emergency communications, utilizing highly reliable, widespread communication channels such as HF, GLOBALink/HF, VHF, GLOBALink/VHF, SATCOM, GLOBALink/Satellite (Aero H and Aero I) and the like. Emergency high priority backup may be via special cellular such as, by way of example, AirCell. For extreme emergencies such as in an intercept condition, a high bandwidth wireless LAN may be used, and installed, for example on intercept aircraft. A wireless LAN 802.11 or modified wireless LAN 802.11 may be used for this purpose. It is suggested that a special 802.11 frequency band or protocol be created for the use in government/transportation operations. This would eliminate interference between commodity commercial 802.11 data devices and the important emergency response government/transportation systems.

Additional options using medium bandwidth (typically 16 kbps) include MIL radio links using UHF, UHF-SATCOM, VHF Aircraft and various radio channels (e.g., AN/ARC-182, AN/ARC-210). It would not be desirable to outfit commercial aircraft with Type-1 encryption devices due to the "top-secret" security overhead of these devices. Various alternate commercial encryption devices such as DES, triple DES and the like and commercial protocols may also be used permitting connection to military radio without typical use of TYPE-1 military encryption devices. Some of the US fleet of military aircraft and military ships at sea that might be utilized in threatened transport intercept operations is currently outfitted with image reception equipment such as the PhotoTelesis Corporation model FTI (Fast Tactical Imagery) equipment or AIR-RIT (Aircraft Remote Image Transceiver) equipment, and PRISM family (PhotoTelesis Remote Imagery and Surveillance Module). These units are currently deployed utilizing military protocols and encryption. Minor modifications to allow communications with commercial encryption and communications to the commercial airlines allows simple and economical reception of transport video directly into these aircraft. The aircraft can then relay the images utilizing standard military SATCOM (TACSAT) for over the horizon communications, line-of-sight radio, or other method to an operations center for further analysis and dissemination.

For medium priority that is utilized for real time surveillance, image transmission, streaming video transmissions, a higher bandwidth (typically 64 kbps and above) is required. Typical communications channels include Aero H+, Inmarsat 3, Iridium, and newer flight entertainment services, such as: Connexion by Boeing, Inmarsat and Airia, In Flight Network by Rockwell Collins/News Corporation/Globalstar, Thomson, CSF Sextant and Astrium, Flight Connect by Tenzing, InFlight Mail by Honeywell/Seattle Labs, Inflightonline.com, LiveTV, GTE, ATT, Aircel, AirTV, ICO Global/Teledesic, and ARINC. Lower priority channels may be used for example to for non-real time downloads such as aircraft performance data, aircraft operational data and archival surveillance data.

In the preferred embodiment, an acceptable prioritization scheme is as follows:

High Priority—Primary for Emergency
  Utilized for primary EMERGENCY notification
  Utilized for indicating TYPE of emergency
  Utilizes Highly Reliable, Widespread Comms
  Utilizes Highly Reliable, (typically 2400 bps) circuits.
  HF, GLOBALink/HF
  VHF, GLOBALink/VHF
  SATCOM, GLOBALink/Satellite
  AeroH
  Aero I
High Priority—Backup—for Emergency
  Special Cellular
  AirCell
High Priority—Intercept—High Bandwidth for Extreme Emergency
  Installed on Intercept Fighter Aircraft
  Utilized for real time surveillance
  Utilized for Streaming Video Transmissions
  Utilizes higher bandwidth (typically 11 mpbs circuits
  Wireless LAN 802.11, close range
  Modified LAN 802.11, close range, for Government Use Only)
High Priority—Intercept—Medium Bandwidth for Extreme Emergency
  Utilized for Image Transmission
  Utilizes medium bandwidth (typically 16 kbps) circuits
  MIL Radio Link to Intercept Aircraft
  UHF
  UHF-SATCOM
  VHF Aircraft
  Radio Examples
  AN/ARC-182
  AN/ARC-210
  Utilized Crypto Eliminator
  IP to Synchronous Data in Radio Format
  Allows Connection of Military Radio without typical use of Type-1 Encryption Devices.
Medium Priority
  Utilized for real time surveillance
  Utilized for Image Transmission
  Utilized for Streaming Video Transmissions
  Utilizes higher bandwidth (typically 64 kbps and above) circuits
  Aero H+
  Inmarsat 3
  Iridium
  COMSAT
  Proposed in flight entertainment services carriers
  Connexion by Boeing
  Inmarsat and Airia
  In Flight Network by Rockwell Collins/News Corporation/Globalstar
  Thomson, CSF Sextant and Astrium
  Flight Connect by Tenzing
  InFlight Mail by Honeywell/Seattle Labs
  Inflilightonline.com
  LiveTV
  GTE & ATT
  Aircell
  AirTV
  ICO Global/Teledesic
  ARINC
Lower Priority
  Utilized for non-real time data downloads
  Aircraft Performance Data
  Move to Airline Maintenance Server
  Aircraft Operational Data
  Move to Airline Operations Server
  Archival Surveillance Data
  Move to Facility Surveillance Server It should be clear to those skilled in the art that other circuits may be added to this priority, and that the priority may be modified based upon changing circuit conditions or desired mode of operation.

The multi-media security and surveillance system of the subject invention provides an enhanced situational awareness system giving instantaneous and live image access to critical components and areas of an aircraft or vehicle, providing the ground based security personnel with additional information while the aircraft or vehicle is not in use and is left unattended. In addition, the permanent data record will prove invaluable for investigating unauthorized activity or accidents after they have occurred. The preferred embodiment of the system is specifically designed for commercial aircraft but is equally well suited for other transports and applications as well, and may be scaled up or scaled down depending on application.

In general, and as will be further described in detail herein, the system includes multiple cameras with continuous video and/or images stored on a hardened recorder located at the point of installation, such as onboard the aircraft. Panic buttons are strategically placed in cabin and cockpit areas, with portable panic buttons worn by Flight Attendants, Flight Crew and Air Marshals. Various other event sensors may also be employed, such as fire and smoke detectors, heat sensors, pressure sensors and the like. In the preferred embodiment, alarm conditions and events are linked to ground stations—FAA Centers, Airline Offices, Airport Security and the like. Video/Image streams are linked to the ground. Video/Image streams are also linked to mobile units such as intercept aircraft and ground security vehicles.

One aspect of the invention provides for continuous or selective monitoring of a scene with live video to detect any change in the scene while minimizing the amount of data that has to be transmitted from the camera to the monitoring station and while at the same time maximizing storage, search and retrieval capabilities. Another aspect of the invention is a method of event notification whereby detected events from sensors, sensor appliances, video appliances, legacy security alarm systems and the like are processed and a comprehensive and flexible method of notifying individuals and organizations is provided using a plurality of methods, such as dial up telephones, cellular and wireless telephones, pagers, e-mail to computers, digital pagers, cellular phones, wireless PDA's, and other wireless devices, and direct network notification to workstations based on I/P addressing such as to workstations, digital pagers, digital cellular phones, wireless PDA's and other network and wireless devices.

The preferred embodiments of the invention are directed to a method for collecting, selecting and transmitting data available at a camera and other sensors to a remote location and includes collecting the image data on a preselected basis at the camera and defining and transmitting an original scene to the remote location. The subject invention is directed to several distinct aspects of event data collection and retrieval, namely: (1) motion and object detection, (2) data archive and retrieval, (3) legacy sensor and alarm data importation, (4) event filtering to qualify alarm and supervisory events (prioritization), (5) notification, and (6) user interface technology.

Turning now to FIG. 1, the aircraft 10 is shown in flight as 10a, on the ground as 10b and at the gate as 10c. The sensors and cameras on the aircraft (see FIG. 2) provide onboard situational and event data that may be transmitted from air-to-ground to a flight control station 11 while the aircraft is in flight. While in motion, data can be transmitted continuously but the bandwidth requirements for servicing a large number of transports simultaneously becomes impractical. Because of this, data is transmitted either by "pushing" it to a monitor station during and emergency situation, or "pulling" it to a monitor station on request by the monitor station operator. This same data is transmitted to a ground control station 13 once the aircraft is on the ground and to a terminal center 14 while the aircraft is at the gate 17. The flight control station may be an FAA regional center, or the like. The ground control station is typical of ground control stations currently in place at all commercial airports. The terminal support center 45 may be tied directly into the terminal security system where terminal security personnel monitor both the terminal and the aircraft while at the gate. In the preferred embodiment of the invention, the aircraft in flight will transmit and receive data from the flight control station 11 and from a ground station 18 via satellite transmission 19 and when in line-of-sight by utilizing non-satellite based transmission 21. All of the communication nodes a the FAA Center 11, Ground Control 13, Terminal 15, and Ground Station 18 can be interconnected to the LAN/WAN network cloud (not illustrated). This provides data interconnectivity with the aircraft at all times during its flight, taxi, and docked operations. As is needed, such as during an emergency event, the collected data is sent over a wide area network (WAN) 23 to various recipients such as homeland security 25, the FBI 27, CIA 29, and the airlines 31, respectively. Once on the ground, the data is transmitted and received from the ground control station 13 for management of the aircraft while on the airport property. The data may also be transmitted directly to mobile units such as the response vehicle 33. The data collected at ground control is managed and transmitted via an airport WAN 35, where it is distributed to flight WAN 23 and to various response units such as Fire, Police, Airline and EMS units indicated by 37, 39, 41 and 43, respectively. Once at the gate, the aircraft is tied directly into the airport terminal security system. The data continues to be managed via the airport WAN. The airport security personnel station 45 also has access to all ground and gate data. Because all of the data is managed by networks, and because all of the communications nodes 11, 13, 15, and 18 can be readily interconnected to the WAN cloud, all emergency response organizations may maintain access to the transport at all times when needed. For example, if a hijacking event were occurring on the ground with radio interconnect to aircraft 10b being accomplished via the ground control 13, situational data can be provided to the FBI, CIA and the like through the interconnectivity of WAN clouds 23 and 35.

A more detailed explanation of the specific functions and operations of the system follows.

Figure 2:
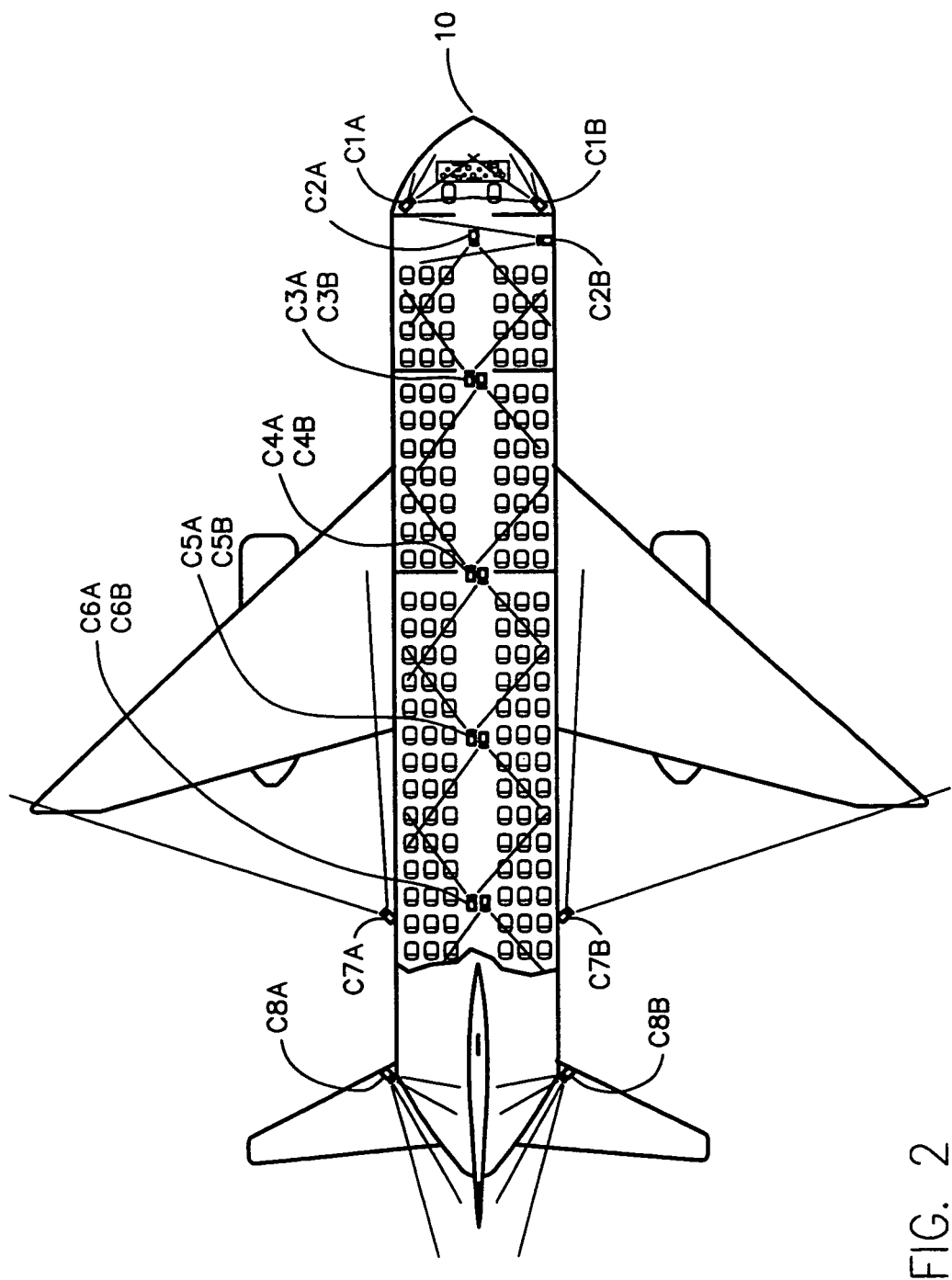
FIG. 2 is a cutaway drawing of a typical aircraft equipped with the surveillance system of the subject invention.

With specific reference to FIG. 2, the aircraft 10 includes a plurality of cameras C1A-C8B strategically installed in the cabin, cargo hold, and cockpit of the aircraft and at strategic locations on the exterior of the fuselage as well. The cameras provide video and image capture of strategic locations throughout the aircraft, providing full range view of the cockpit, cargo hold passenger cabin, the tail and wing area and other strategic locations such as the landing gear, engine mounts and other areas as desired. In the illustrated embodiment, dual camera mounting provide redundancy, with the "A" cameras and "B" cameras capturing overlapping zones. Also, in the preferred embodiment at least some of the cameras are wireless. The installation of the cameras and sensors may be obvious to deter malicious activity, or covert to conceal surveillance and to prevent vandalism or sabotage of the sensors. In addition, the subject invention supports both legacy analog cameras and full digital cameras. In the legacy type analog camera the data signal is encoded into a digital IP format for transmission by the use of an encoder module. In the digital cameras, the data signal is also in an IP format as it leaves the camera module. The cameras may be continuously activated for capturing and storing the collected images on an onboard data recorder, as will be explained, and the system may be activated to send the data to a remote location on a real time basis in response to the occurrence of specific events. The system supports the integration of various legacy sensor devices such as engine monitors, fire and smoke detectors and other operational and condition data generators. These are also converted to an IP format and stored on the onboard recorder. Audio may be similarly collected and stored. The system is specifically designed to download or transmit critical data to a remote location in response to the occurrence of certain events. These may include a detected drop in cabin pressure, a change in course, a change in speed, an engine malfunction, a loud noise, or other malfunction, as well as manual triggering from a panic button or the like.

In the preferred embodiment, the cameras produce multiple simultaneous streams of data. This provides maximum system flexibility in matching available channel bandwidths and transmitted image/video resolutions. For example, high resolution video and images can be sent to the on-board hardened server for possible future event investigation, medium resolution can be sent via 802.11 wireless to on-board Air Marshals equipped with wireless PDA's, and low resolution streaming video can be sent on-demand over the 64 KBPS or 128 KBPS satellite link.

Figure 3:
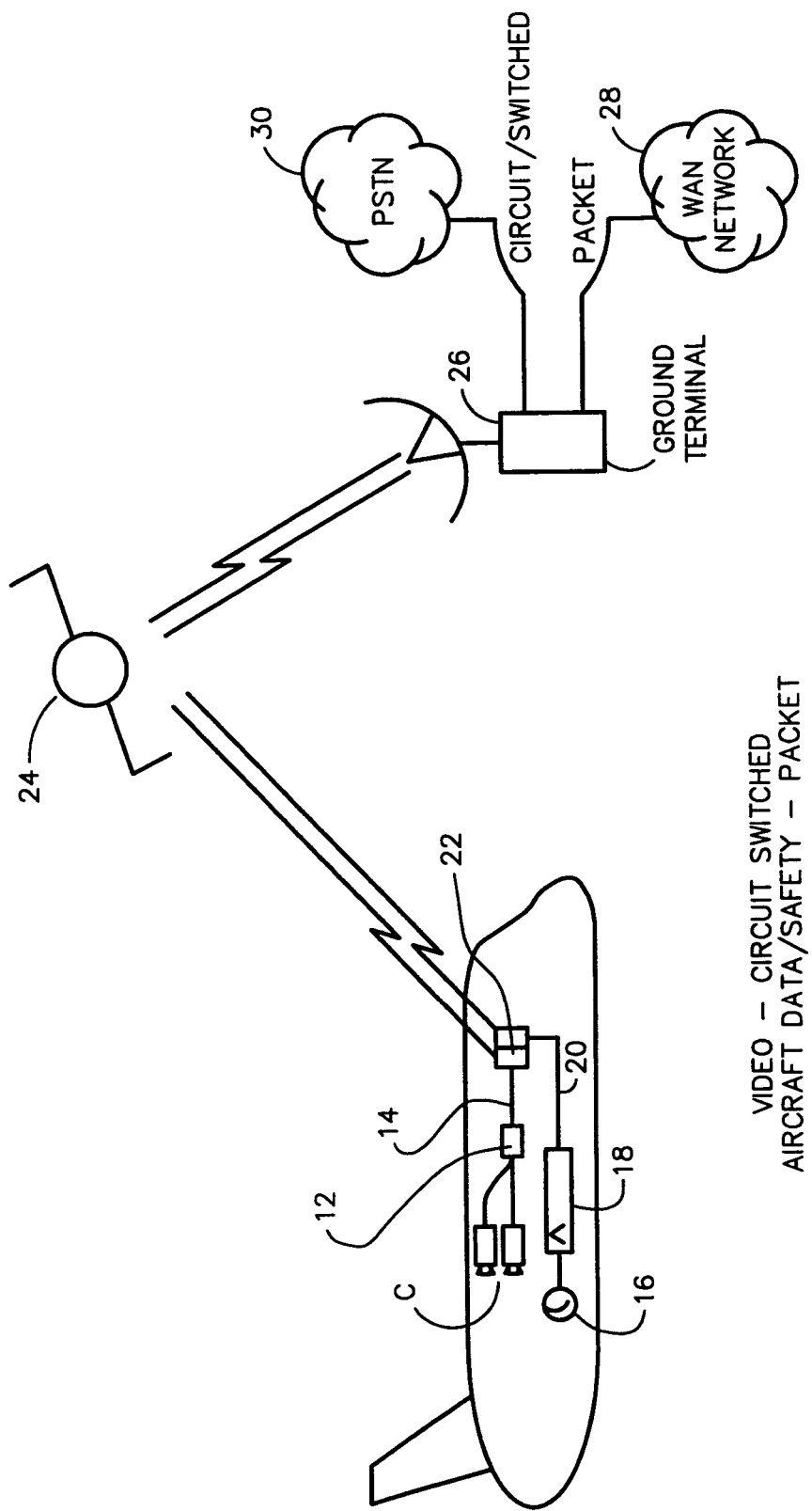
FIG. 3 illustrates the system for air-to-ground transmission utilizing a communications satellite.

As shown in FIG. 3, the basic system includes the cameras shown in FIG. 2, here designated as C. The camera network communicates with a camera controller 12 where the various data signals from the cameras are combined into a comprehensive IP video data signal on line 14. The various instruments and other legacy devices 16 provide legacy data that is converted into an IP format at controller 18 and provided on line 20 as packet data. In addition, to various instruments, this may include sensors such as acoustic sensors, fire and smoke detectors, impact sensors, audio sensors, cabin pressure and temperature sensors and the like, as well as scanners such as facial recognition devices or fingerprint scanners for identifying persons as they boar the aircraft. Routine data, such as navigational data including location, altitude, direction and speed, may be transmitted continuously over the link. The data content of such data is not large, and is not needed on a very high frequency, thus a very large number of transports may communicate their navigational data over a shared circuit without excessive latency or interference.

Situational awareness data such as imagery, streaming video and streaming audio is both high in data content and degraded by latency. It is therefore desirable to provide a means to control or "trigger" the transmission of this data either automatically by a detected event, or upon request by a monitoring station.

When triggered by any of the various events, the video data and other packet data are transmitted in IP format via the SATCOM link 22 to a communications satellite 24 and via the satellite 24 to a ground terminal 26, where it can be managed and distributed for surveillance, assessment, archiving and response purposes. The data can be readily distributed over a connected LAN or WAN network, as indicated at 28 and/or over switched circuits such as the PSTN 30.

As shown, routine data such as continuous navigational data from a large number of data would be transmitted utilizing a packet-switched channel from transponder 22, through the satellite 24, ground station 26, then to a WAN 28 distribution the data to airlines, FAA centers and the like that utilize navigational data. Again, this is routine and "continuous" transmission that is utilized to poll or to track the progress of the aircraft in flight. This is a common operation today. It is possible to transmit all data types on a circuit switched circuit or packet switched circuit if sufficient bandwidth is available for the data type. However, circuit switched and packet switched circuits have different characteristics that make their use optimal for different conditions.

Typically circuit switched data is higher in bandwidth because it is a "private" and point-to-point dedicated connection. For example, an Inmarsat ISDN circuit switched channel can provide a dedicated 64 kbps circuit from a transport to a ground station suitable for moving full motion video. It can, however, only service one transport at a time because it is a dedicated connection once it is established. The connection can be brought up and down "on demand". In this application, the channel would be idle unless an event is underway or unless a monitor station has activated the circuit.

Typically packet switched channels are available to the transport continuously, but are shared among multiple transports. For example, an Inmarsat packet switched channel can have a 64 kbps data rate, but the full data rate is not available to the transport all of the time because of two conditions: 1) the overhead of protocol utilizes some of the bandwidth and 2) the channel is shared between multiple transports, thus the effective bandwidth is divided. This makes the packet switched channel ineffective for full motion video when starting with a 64 kbps channel such as what is currently available on Inmarsat. (Future advanced satellite systems will have more bandwidth to counteract this problem.) On the other hand, the continuous availability of the packet switched channel makes it ideal for periodic navigation data exchange, safety handshaking, airframe performance reporting, alarm condition reporting, fight plan updating and the like.

It is therefore desirable to optimize the use of available circuits based upon their characteristics such as is shown in FIG. 2, with circuit switched data such as full motion video distributed over the Public Switched Telephone Network 30, and other periodic data distributed over the packet switched network connected to a WAN 28.

Because packet-switched data channels are shared and have higher latency, although that can be utilized for emergency data, they are not ideal for transmission of high bandwidth steaming data. Transmission of emergency data including images and streaming video and audio in the preferred embodiment will utilize a circuit-switched means. This provides a dedicated higher bandwidth, higher availability and lower latency circuit for the transmission of emergency data. This circuit-switched data can then be routed to a terrestrial PSTN 20 (Public Switched Network) for direct dial-up connection to a site such as an FAA center. That node can then utilize the data directly, and/or it can relay it through other communications means including IP based WAN circuits to other facilities.

In a preferred embodiment, INMARSAT would be utilized for this connection. INMARSAT provides a packet-switched common channel for the airline industry that may be utilized for navigational information for all airlines in the sky. INMARSAT also provides multiple simultaneous circuit-switched channels that have a priority establishment mechanism. This provides for multiple airliners that are in distress to simultaneously provide streaming multimedia data to ground and intercept personnel by the use of multiple circuit-switched channels.

Although one type of circuit may be more suited to a specific type of data, the communications controller can use one data type as a redundant mechanism for moving another type of data. For example, if the packet switched connection is saturated or not available, periodic data may be delivered by establishing a circuit switched connection, delivering the data, and disconnecting. If the circuit switched circuit is not available, a packet switched circuit can be utilized to deliver a limited form of data such as still video as opposed to full motion video.

Figure 4:
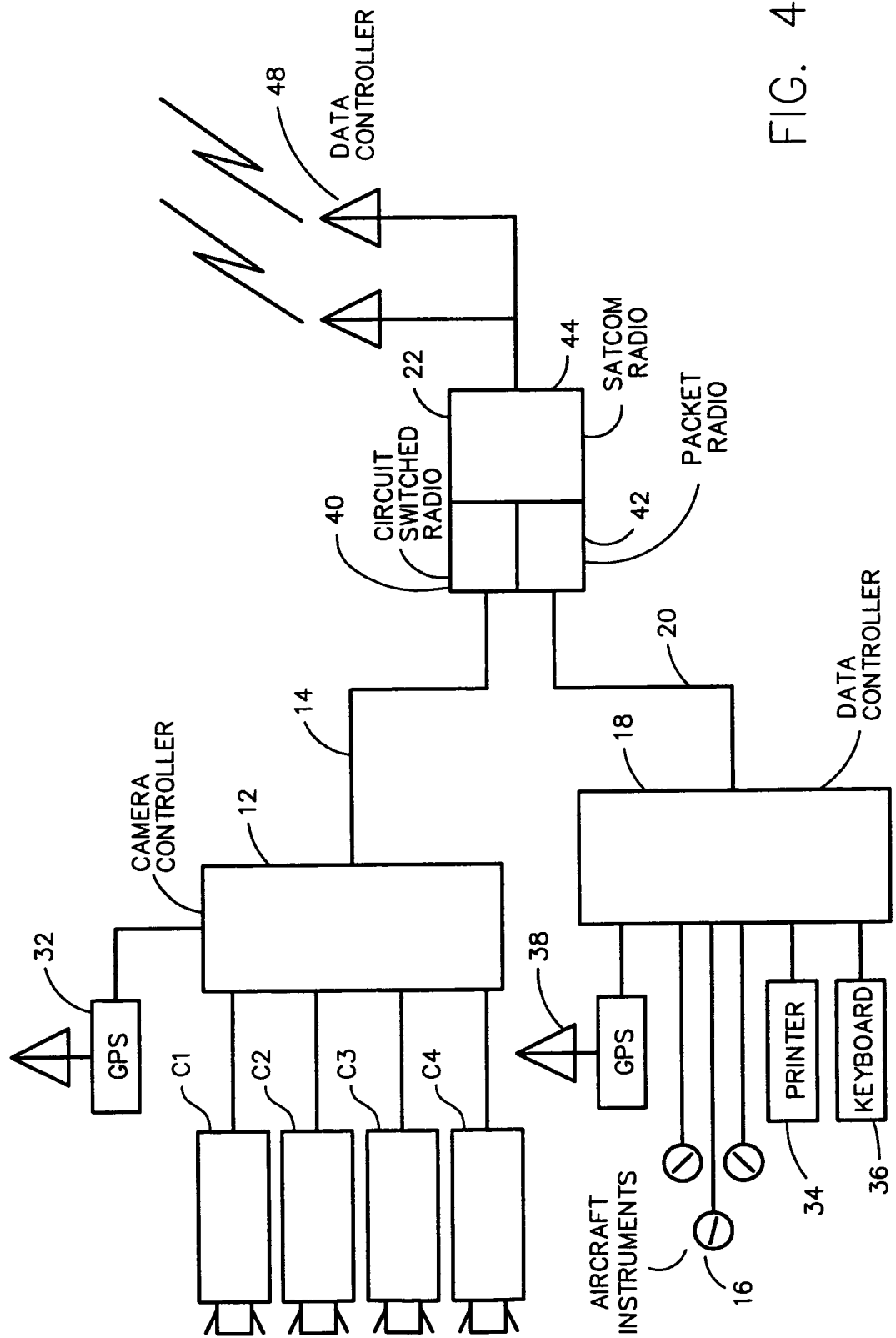
FIG. 4 is a block diagram of a basic transport system in accordance with the subject invention.

The onboard system is shown in more detail in FIG. 4. The cameras, here designated C1-C4, but corresponding generally to the cameras shown in FIGS. 2 and 3, provide a raw data signal to the camera controller 12. The raw data signal may be a digital signal from an analog camera converted at the camera, a digital signal from a digital camera, or a raw analog signal that is converted to digital IP format at the controller. In the preferred embodiment, a GPS signal generator 32 is also associated with the controller 12, permitting a time and location tag to be associated with the data for archival and research purposes. A time stamp alone may optional be utilized, or more data such as navigational information may be included. The controller 12 produces an IP video data signal on line 14 that is transmitted to the SATCOM radio 40. As discussed above, in the preferred embodiment the streaming signal is delivered over a circuit-switched mode 40 of the SATCOM radio, although other modes of transmission are possible.

The various aircraft instruments and sensors 16 produce legacy data signals that are introduced into the data controller 18. This may also include a text data system as indicated by the printer 34 and the keyboard 36. A GPS signal generator 38 is also associated with the data controller.

The data controller 18 produces a comprehensive data packet signal on line 20 and this is also introduced into the SATCOM radio 44. As discussed above, in the preferred embodiment the navigational data is delivered over at packet-switched mode 42 of the SATCOM, although other modes of transmission are possible. The SATCOM radio link then distributes the signal to an antennae/data controller 48 for transmission to the communications satellite 24, see FIG. 2. This mode of operation is typical of the Rockwell ADT-100 or SD-64 IMARSAT satellite radio system or equivalent.

Figure 5:
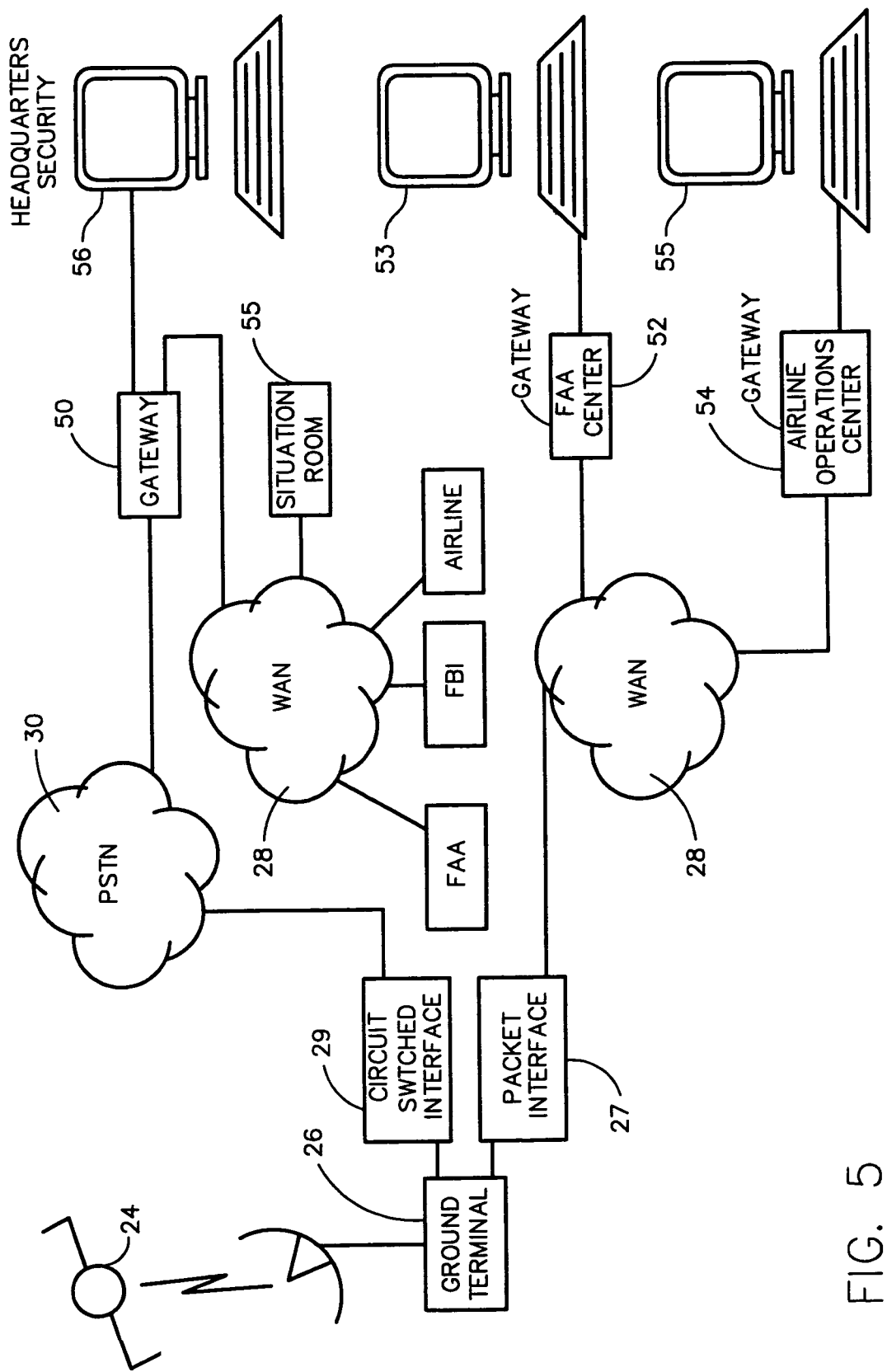
FIG. 5 is a typical ground terminal configuration including multiple base stations.

A basic ground based station is shown in FIG. 5. The transmitted signals are received from satellite 24 by the ground terminal 26. The ground terminal transmits the data to the circuit switched interface 29 and over the PSTN 30 to a network gateway 50. The ground terminal also distributes the data to the packet interface 27 for distribution via the WAN 28. Note that the WAN topology may be configured in many ways, including separate clouds for Government users as opposed to commercial users, and the like. The packet data is then distributed over the Internet or other network to the FAA center and to airline operations as indicated by the respective gateways 52 and 54. The various centers then distributed the data over local LAN or WAN to selected monitoring stations 53, 55, respectively. The PSTN signal introduced to gateway 50 is distributed over the Internet or other WAN to the FAA, various agencies such as the FBI, the airline operations center and other locations such as a situation room 55, and where desired, directly to security headquarters as indicated at 56. Firewalls, Routers, private WANs and LANs and the like may be utilized to accomplish these data transfers in a well known manner.

Figure 6:
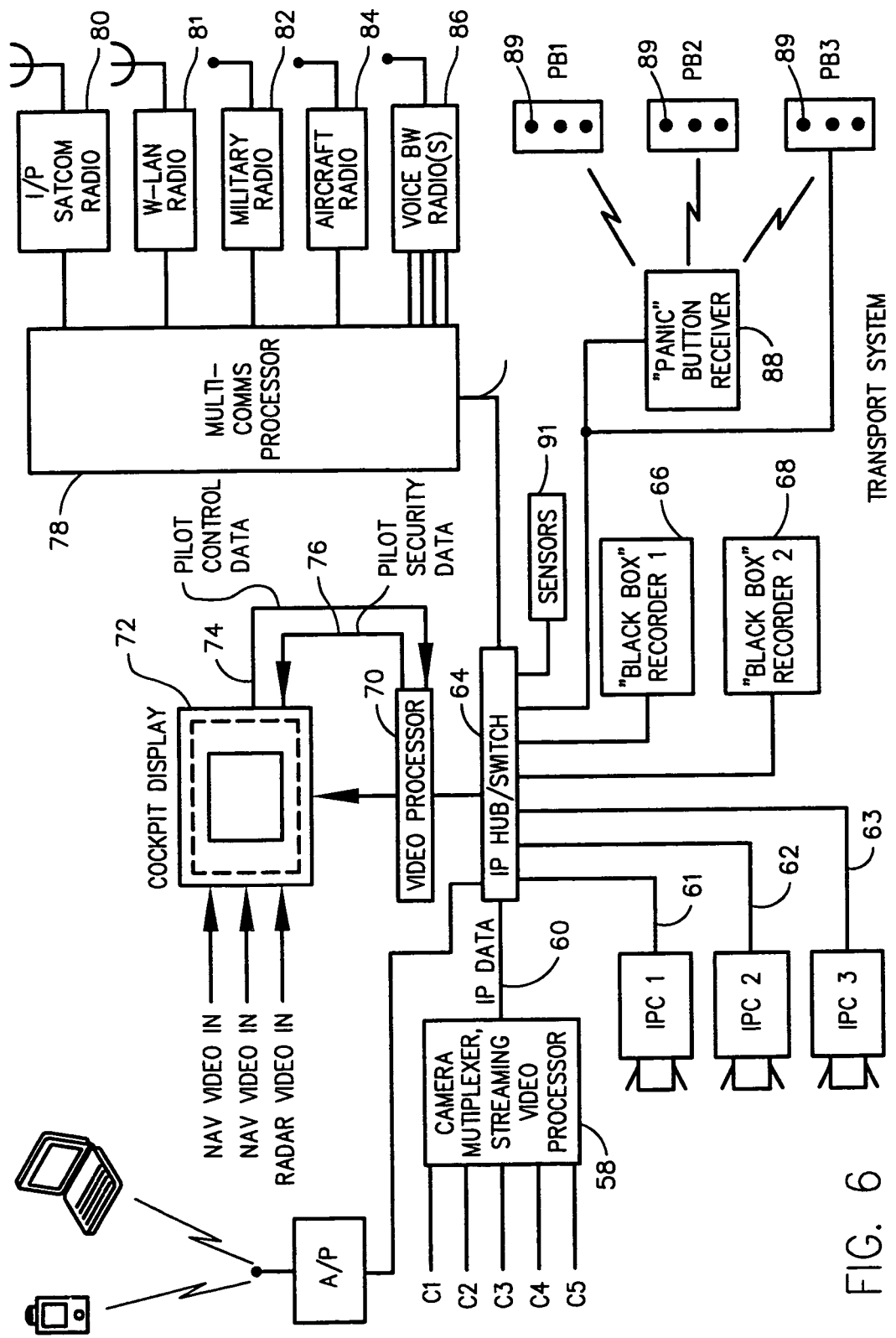
FIG. 6 is a typical transport system integrated with cockpit systems.

The transport system and cockpit center is shown in FIG. 6. IP data communication is central to this configuration. In this case the camera data signals from legacy type cameras C1-C5 are introduced into an onboard multiplexer 58 and converted into IP data as indicated at line 60. Digital IP cameras IPC1-IPC3 may be employed independently of or in combination with the legacy type cameras. These cameras produce IP signals on lines 61, 62, 63. All of the video data is introduced to an IP hub or switch 64. The hub 64 distributes the data onboard to one or more "black box" recorders 66, 68 and via a video processor 70 to a cockpit display module 72. The pilot controls the data so displayed utilizing MDU display user interface buttons or other such user interface, as indicated at 74 and the data may be security access controlled as indicated at 76. The data is also distributed by the hub 64 to the multiple link communications processor 78 for off-board transmission via an 802.11 WLAN radio 81, an IP SATCOM radio 80, a military radio 82, an aircraft radio link 84 or voice bandwidth radio, modem, and optional inverse multiplexer 86 or any communications media including those discussed herein. Regular cellular, PCS and other communication links may be used for alternate ground connectivity and/or extreme emergency air connectivity although such links are not normally used while an aircraft is in the air.

The Aircraft System is linked to Ground Facilities when in the range of the airport W-LAN via W-LAN radio 81. Automatic Down-Line-Loading of Recorded Data may also be employed when in range of the airport W-LAN. Voice-Over-IP (VOIP) intercommunication may be accomplished over the W-LAN.

The Aircraft System may be linked to intercept aircraft or other airliners while in the air over the W-LAN radio 81 also. Transmission of images, video and VOIP and other sensor data may be accomplished over the W-LAN.

The Aircraft System may be linked to intercept aircraft by voice bandwidth digital links as well, such as the military radio 82. Transmission of images, step images, VOIP and sensor data may be accomplished over this link. Video transmission, although possible, will be of extremely low quality due to the limited bandwidth, and would likely not be useful.

Transmission events are triggered by an activation signal that may be from various sources, as previously described. In the illustrated embodiment of FIG. 6, the activation signal for off-board transmission is supplied by the panic button receiver 88 that generates an activation signal upon receipt of a manually input signal from any of the wireless panic button devices PB1, PB2 or wired panic button device PB3. Each wired button is supplied with a unique aircraft location ID. Each wireless button is supplied with unique personal ID for identifying the crewmember or other authorized personnel. In the preferred embodiment the buttons will include a confirmation device, such as an LED 89, for confirming distress call acknowledgement. The confirmation of a call can be closed loop to the panic button controller to ensure button push is delivered, and to the operator at the ground station. This would allow absolute confirmation to the crewmember that the ground station personnel have received the distress signal, and are investigating. Multiple 'types' of Distress Calls can be indicated with multiple buttons.

In addition to manual triggers caused by the use of a panic button, the system is also responsive to automatic distress indications as monitored and reported by the onboard sensors 91. The advantage of automatic sensors is that a distress call will be sent out even if the cockpit or cabin crew were totally occupied by an emergency such as a depressurization, fire or explosion, or if a pilot were to silently hijack the plane.

Examples of such triggers are:

Aircraft off of flight plan as determined by flight computer. An approved flight plan can be downloaded into the flight computer by a secure means, such as over the W-LAN or the Satellite link. This can be done without pilot intervention, and without the ability for the pilot or hostile person being able to modify the plan. During flight, any deviation in route, altitude or airspeed beyond a preset margin would trigger an alarm event and investigation by ground personnel.

Aircraft making abrupt change in is operation can be indicating mechanical failure, attack, or actions of a hostile pilot or adversary. If changes outside of preset limits were seen in the following or similar conditions, an alarm event would be triggered and investigation by ground personnel could be initiated:

Altitude
Bank Angle
Angle of Attack
Airspeed

Aircraft controls in extreme positions (outside of preset limits) can also trigger alarm conditions and ground personnel investigation. Controls such as, but not limited to, the following can be monitored for automatic alarm triggering:

Rudder
Aileron
Throttle
Gear Down vs. Airspeed
Flaps/Airbrakes vs. Airspeed

Out of Limit or rapid change in Aircraft Instrumentation Sensors can trigger alarm conditions for ground personnel. This monitor can simply be a backup to flight personnel to help make sure that all serious abnormal conditions are being responded to, and can alert ground personnel and provide data to them to help them assist the crew in responding to abnormal conditions. Sensors and systems such as, but not limited to, the following can be monitored for automatic alarm triggering.

Temperature
Engine Parameters
Fuel Levels
Hydraulic Fluid Pressure
Electrical System Condition, Voltage, Amperage Specialized Sensors can be positioned within the aircraft for monitoring the physical condition of the aircraft and its environment. Abnormal settings or conditions detected by these sensors can generate an alarm event and trigger the system. Sensors such as but not limited to, the following may be utilized:

Smoke
Temperature (Fire)
Gear Locks
Door Locks
Hatch Locks
Strain Gauges

Alarm conditions may be initiated by either manual (panic button) or automatic distress activation as has been discussed. The responses to a triggering event, whether manual or automatic, include:

Alarm Indication in Cockpit, where the primary source of the alarm such as a sensor condition is presented, as well as ancillary data. For example, if an engine over-temperature condition or even a fire detection condition is sensed, the camera that is situated to view that particular engine can be automatically switched on for the pilot to review. Likewise, temperature or smoke abnormalities in the cargo bay can be indicated, and a cargo bay camera can be switched on in the area of the abnormality. If viewing of several cameras is required to inspect the cause, they may be presented in split-screen or in rotating sequence in a well known manner.

Alarm Indication can be Transmitted to Ground automatically. Such transmission would include several data types, which would vary depending on the type of alarm it is. In the preferred embodiment, all alarms would include:

Flight Identification—Tail Number, Flight Number, etc.
Alarm Initiation Identification—Location on Plane if Wired, or Employee ID Number and Type of Alarm if Wireless.
Type and Details of Automatic Activation
Associated video or images as is determined by the processing of such alarm.

Initialization of Streaming Video associated with the alarm condition can be accomplished if Bandwidth is available. The on-board system would process the alarm type and select the appropriate camera or cameras to stream for that alarm condition. For example, if a panic button were pressed, the closest cabin or cockpit camera or cameras would be activated for streaming transmission. Spilt screen transmission or automatic time sequencing of the cameras may be selected if more than one camera is determined to be necessary to evaluate the condition. As illustrated previously, if an engine overheating condition or fire were detected, a camera or multiple cameras viewing the engine could be selected for streamed over the communications channel.

Initialization of Step Video may be preferable to full-motion video. Step Video would be utilized if there were not enough bandwidth to support full motion video circuit, or if a plurality of video sensors wanted to be monitored in a "round-robin" fashion. This would enable the system to build matrix of images from a plurality of cameras by refreshing each screen one-by-one until they have all been refreshed, then looping back to start the refresh again. Camera selection can be accomplished, as in previous discussions, by association of cameras to sensors.

Step Video would be utilized to communicate to the PhotoTelesis military imaging systems that utilize WaveBurst communications. Camera selection can be accomplished, as in previous discussions, by association of cameras to sensors.

Initialization of Still Video would be utilized where high resolution images are needed, or where there was not enough available bandwidth to transmit full motion video or step-video. Camera selection can be accomplished, as in previous discussions, by association of cameras to sensors.

Initialization of Streaming Audio can be initiated by alarm conditions as well. For example, if a panic button were depressed, the associated microphone associated with that panic button can be activated and the audio stream relayed to the monitor station.

Automatic Signaling to Monitor Stations can include animated displays of periodically changing information in such a way that the personnel monitoring the situation will be kept apprised of the situational awareness data. This can include:

Automatic Map Display of the proper map for the area that the aircraft is in.
The Plane Icon is located on map, and tracks the aircraft location as it is moving
Automatic Flight Data Information Displayed, showing all pertinent flight controls, fuels, and aircraft status.

Once the connection has been established to the ground from the aircraft during an emergency situation, utilizing ground based or satellite WAN systems Multiple Monitor Stations can be activated at one time. Utilization of IP broadcasts on the WAN can supply information for virtually an unlimited number of monitor stations as needed.

Monitor stations can provide video display of camera information:

Geographic Independent—all data over IP over WAN
Streaming Video on Monitor CRT's
Multiple Camera Display, such as 2.times.2, 3.times.3, 4.times.4 and larger
Multiple Monitors if more desired
Still Images on Monitor CRT
Multiple Camera Display, such as 2.times.2, 3.times.3, 4.times.4, and larger
Multiple Monitors if more desired
Stills and Streams intermixable on 2.times.2, 3.times.3, 4.times.4 and larger Likewise, once the connection has been established to the ground from the aircraft during an emergency situation, audio can be distributed to one or more stations. If multiple stations are utilized, they may be geographically distributed using a WAN, such as the Internet. Audio may be presented in many ways:

Streaming Audio to Monitor CPU Audio Speakers
Streaming Audio to IP Telephones as Required
Streaming Audio to portable monitoring units such as PDA's, laptops, or streaming audio devices.

After an emergency condition has been signaled and a ground connection is established, the ground network can perform automated alerts to ground personnel inviting them to review the condition and respond. This "Event Notification" can be accomplished in many ways depending on the devices that are to be utilized:

SIP Protocols can be Utilized for Event Notification, the standard technique now being utilized for call establishment in VOIP systems.

E-Watch automated alerts are available, pushing notification of an event and information pertaining the event and is forwarded to basic personal communications devices utilizing:

Dedicated message packets to a computer, with specific GUI response
E-Mail to Computers
E-Mails to Pagers
E-Mails to Wireless Telephones
Dial Up to a Pager
Dial Up to Wireless Phones—with Audio Feedback describing the event
Dial Up to POTS Telephones—with Audio Feedback describing the event A response station, independent of having been activated automatically or manually, can have "remote control" over the sensors in the aircraft. Some of the available controllable features include, but are not limited to:

Camera Selection
Camera position adjustment
Camera image quality controls, such as brightness and contrast
Audio Selection
Audio quality controls, such as gain, and frequency response Perhaps one of the most important features of the system, beyond emergency event notification, is being able to access historical flight information while the aircraft is in flight or on the ground. If an emergency notification is received while the aircraft is in flight, not only can real-time information be viewed, archived historical information can be down-linked and reviewed. This can provide immediate insight as to why the incident has happened without having to wait for the recovery of the hardened data recorder. This may also help ground personnel assist the cockpit and cabin crews in responding to the emergency. For example, if an engine has stopped and the flight crew cannot restart it, the ground personnel can look back in the on-board database at the engine data, analyze it, and give information to the crew. Another example would be if the landing gear would not deploy down for a landing, the ground crew off-board (or the flight crew on-board) could look back in the database and review video captured during the time when the landing gear was retracting. Perhaps sighting damage in the gear would give insight on how to handle this situation. In more extreme conditions, if a distress signal is received, an aircraft image and data download from the server can be initiated, giving a comprehensive view of the personnel, aircraft and performance and navigational data for minutes or seconds prior to the event detection and notification. This would provide to the ground immediate and conclusive information as to what had happened to the aircraft. For example, if a missile were launched into the aircraft destroying part of a wing, images of an incoming missile stored in the database prior to the event detection would be relayed to the ground. Even if this event caused the aircraft to crash and even if the data recorders were destroyed, and clear and conclusive understanding of the event would be saved on servers on the ground. This example can also be applied to structural failures, such as failing engine mounts or tail structures. Clear images of these failure mechanisms can be captured on the on-board database prior to failure. When an emergency event is triggered, a few seconds or minutes of this database can be downloaded for analysis and preservation. The usefulness of this type of recording and down-linking is endless.

Map type displays are utilized to review the locations of sensors that generate alarms, and to manually select sensors for viewing. Map (or diagrammatic) indication of sensors and points of failure provide a user-friendly graphic interface, greatly enhancing the monitoring features of the system. Some of the most desirable mapping and display functions include:

A hierarchical "Map" representation can be presented allowing "drilling down" from a world-wide-view of the system to a single camera on a single airplane. For example, FAA center personnel can be presented with a world map with all airplanes indicated per GPS location information. This can be filtered by selectable parameters, such as country of origin, airline, time-of-arrival. The "range" of the map can be adjusted, to a continent, a state or a locality. In all cases, at this level of the hierarchy is a geographic map.

Drilling down, a single aircraft can be selected, such as by right-mouse clicking on the icon. Left mouse clicking can display the "properties" of the aircraft, such as airline and flight number, tail number, altitude, bearing, and groundspeed. After right mouse clicking, based on the aircraft type and the equipment configuration on board, the appropriate "floor-plan" of that aircraft as annotated with its sensors is loaded. This load can either come from a comprehensive server on the ground, or can be downloaded from the aircraft itself. A new set of icons is displayed, now on the floor-plan of the aircraft. Right clicking on the icon will display its data, left clicking will display its properties.

One airplane could have multiple "floor-plans". For example, a 747 has both a main cabin level, and an upper level for passengers. This can be portrayed with two floor-plan maps. More maps can utilized if desired, such as 1) the Cockpit, 2) First Class, 2) Business Class, 3) Economy, 4) Upstairs Deck, 5) the Downstairs Galley Area, 6) Fore Cargo Hold, 7) Aft Cargo Hold, 8) Exterior Cameras, and the like.

Data would depend on the sensor. If the sensor were a camera, clicking on it could initiate a video stream. If the icon were an engine, clicking on it could take you to another "floor-plan", in this case it is a diagram of the engine systems. Icons on the engine systems diagram would show more sensors, such as cameras, temperature and pressure transducers, flow meters, and the like. Right clicking on those would present the data from them.

Note that the hierarchical method of "drilling down" works for historical data as well as real-time data, and the display can switch from real-time to historical date at the click of the GUI. When historical data is called for, it is down-linked to the ground server where it is cashed and stored. The operator may then go to a given time and look at instantaneous data, or select two points in time then "play" the historical data between the two points. Playing can be any speed, such as 1:1 to playback incidents as they happened, slow speed for careful analysis, or high speed to review data quickly.

The hierarchical method can also be applied to the ground facilities, such as the airport runways, taxiways, terminal areas, etc. As an example, imagine starting with a world map, drilling down the hierarchical levels by mouse clicks as follows:

World
State
City
Airport (Example, Love Field vs. DFW)
Area of Airport: Runways, Taxi Area, Termianls
If "Terminals", Terminal A, Terminal B Terminal C
If "Terminal C", American, Continental, Delta
If American, Gates, Admirals Clubs, Food Court, Security Check
If "Gates", Gate 11, Gate 12, Gate 13A, Gate 13 B, and the like.
If "Gate 13 A", Waiting Area, Jetway, Ramp, Stairway, and the like.

As discussed earlier, "Maps" can include a variety of data presentations, such as:

Geographical Maps for Facility Placement
Geographical Maps for Airline Location (Planes move on map)
Specialty Maps for Airport Runways and Taxiways (Planes move on map)
Facility Floor Plans for buildings, hangers, etc.
Aircraft Floor Plans
Aircraft Cross Sections
Aircraft Components Cross Sections Diagrams of Systems, such as engines, hydraulic systems, electrical systems, and the like Aircraft or Camera Selection for monitoring can be made by:
   Clicking on icons on maps
   Keying in airline and flight number
   Keying in the aircraft tail number
   Keying in the aircraft serial number
   Keying in or clicking on country, state or city
   Keying in or clicking on air route
   Keying in or clicking on camera lists or camera icons In addition to triggering the transmission of data from the aircraft to the remote station in response to an event, it is also possible to download or pull information from the aircraft without the presence of an active alarm condition. Typically, this can only be done with password authorization, and all such actions will be logged with information as to who accessed the information and when. Examples of such actions include: ground intercept aircraft initiated data transfers
   initiate video streaming,
   initiate high resolution still image capture and transmission,
   remote selection of cameras and sensors, and
   remote selection of audio—remote reading of aircraft instrumentation Data.

Both real-time data and historical data may be downloaded to the ground or remote stations. Many data handling options are available during the playback mode for viewing both real-time and historical, stored data as follows:

Monitor Stations will record incoming video, both real-time or selected historical data, on either the monitor station local storage, or on a ground based server supporting the operation. This facilitates future investigation should the on-board date be lost. The storage will be in identical format to the received data, bit-for-bit, thus facilitating accurate reproduction for data analysis and court evidentiary purposes.

Monitor stations can play back stored streaming video at "normal" speed, or at faster or slower speeds for careful analysis or viewing data faster respectively.

Monitor stations can play back stored streaming video forward or backwards.

Monitor stations can play back stored streaming video frame by frame for careful analysis, exploitation, printing, or e-mailing.

Full motion streams that have been transmitted in real-time to the monitor station and are stored at the monitor station or an associated server, can then be played back to an area of interest and paused. Then the select frame or frames of the lower resolution streamed video can be requested from the aircraft server, thus initiating a down-link of the specified high-resolution still or stills. This powerful feature allows preservation of bandwidth for the full-motion real-time video stream transmission, yet allows the investigator in near-real-time to select and identify the timeframe that high resolution imagery, or full motion video, be pulled off of the airborne server and down-linked to the monitor station for review.

The above technique can also be utilized to specify from received low-resolution real-time full motion video steams, periods of on-board recorded full-motion video to be down-linked in higher resolution format. The down-link of this high resolution video would not be down-linked in real-time because the bandwidth to do so is not available, so it would down-linked at the channel speed and would be stored on the monitor station then could be played at real-time speeds. However it would be delayed and not real-time data.

Many features for controlling down-linked frames are presented:
   downloaded frames can be selected and displayed;
   downloaded frames will be stored on monitor server or local disk drive for future use;
   downloaded frames can be exploited by image processing tools;
   downloaded frames can be printed;
   downloaded frames can be e-mailed;
   multiple downloaded frames can be played back as motion;
   cameras can be selected prior to downloading;
   resolution of frames can be selected before downloading; and
   frame rate of sequences can be selected prior to downloading.

Audio sources can be downlinked in real-time, or from historical data stored on the on-board server:
   Audio sources to be streamed can be selected for real-time streaming.
   Audio will be played in real-time synchronized with incoming streamed video.
   Real-time streamed audio sources will be stored on the monitor station local disk or on an associated server for future use.
   Playback of monitor station stored video will be synchronized with any stored audio from the same time frame.
   Audio from other time frames can be selected and pulled from the on-board server. The audio source can be selected prior to downloading.
   The monitor station can play back stored audio at normal speed, or at a faster or slower speed that normal speed.
   Downloaded audio will be played back synchronized with video if available.
   Downloaded video will be played back synchronized with audio if available.

The aircraft can stream event alarms and other aircraft event data. This can be done in a routine manner, such as sending routine navigational information, or in extraordinary cases such as streaming aircraft systems and sensor information during an emergency event. For example, the "packet-switched" data previously discussed can be transmitted from the aircraft to a monitor station and recorded in a continuous manner. If an emergency event then occurs, the additional "circuit-switched" information will be recorded as well. This information can be recorded on the same workstation or server, or different workstations and servers, then merged for analysis.

Events will be dynamically displayed on the monitor station as they occur, as well as being recorded. The recorded events stream can be "played back" backwards and forwards, normal speed, faster speed, or slower speed. Playback of recorded audio and/or video can begin based on finding events. Real time audio and video streams can be displayed in conjunction with real-time event streams.

Note that different object streams received by a monitor station and recorded may universally be utilized to index into data stored on the on-board server to initiate a down-link of other data. For example, a recorded event stream can be advanced to a point of interest. A request can then be sent to the on-board server to downlink a specified amount of audio and/or video or images corresponding to that timeframe. Likewise, a recorded video stream can be advanced to a point of interest. A request can then be sent to the on-board server to downlink a specified amount of audio and instrumentation data corresponding to that timeframe. In other words, each data stream is time-stamped and the timeframe identified during playback. That can be utilized to select and request downlinking of any other recorded sensor data from the on-board server in the corresponding time frame. When the down-link is accomplished, the data is recorded at the monitor station or an associated server and all recorded data can be played back in synchronized form in any combination, at any available speed, forward or backward.

Figure 7:
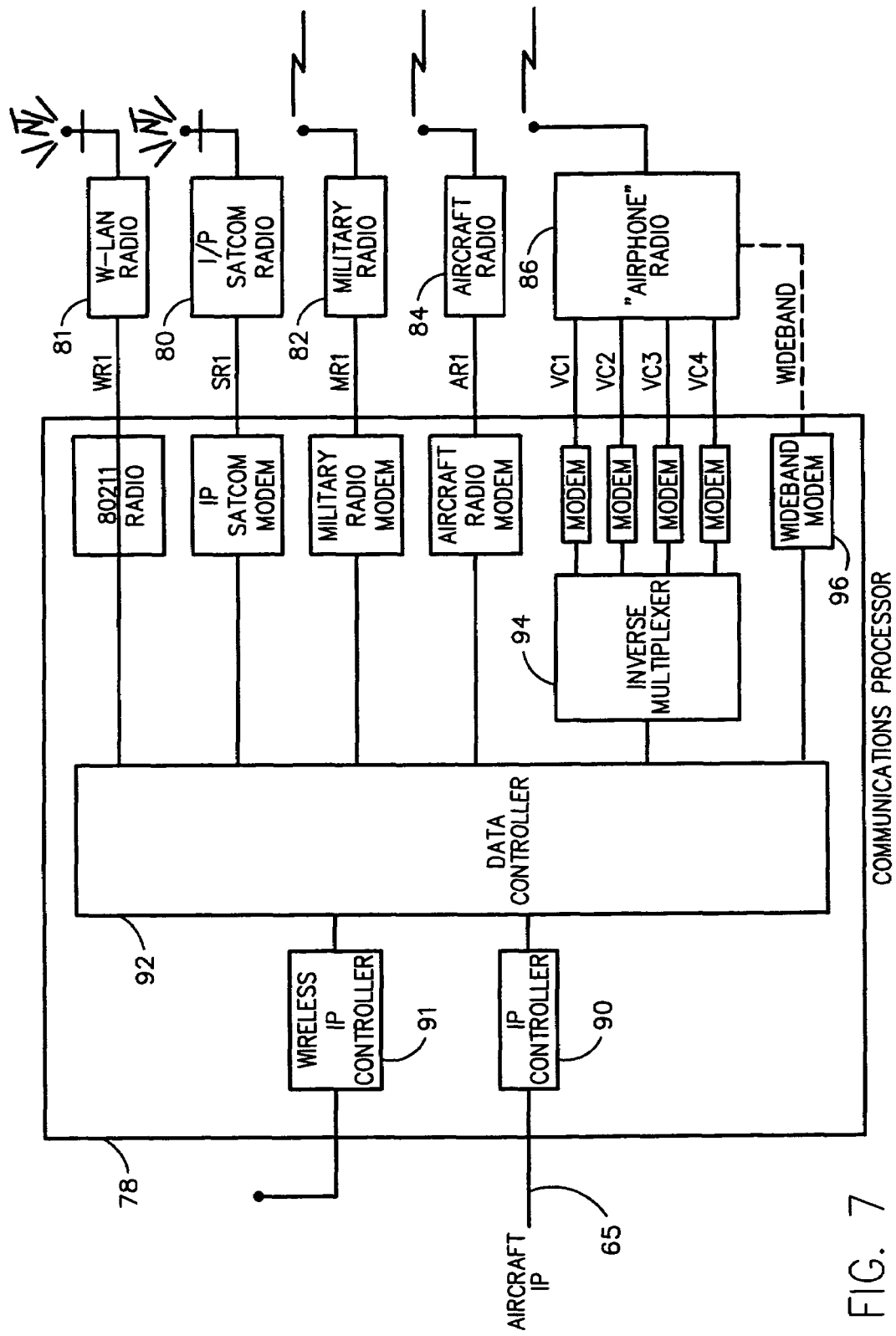
FIG. 7 is a communications processor module for supporting air-to-air and air-to-ground communication over multiple channels.

The multiple link communications processor 78 is shown in more detail in FIG. 7. The aircraft IP data signals on line 65 (see also FIG. 6) are introduced into an IP controller 90 and from there into the data controller 92. A wireless IP controller 91 for on-board wireless user communications to sensors, PDA's, laptops, panic buttons and the like as previously discussed may also be provided. The multiple communication links then receive the signal from the controller 92, via the respective modems and links, as indicated at WR1, SR1, MR1 and AR1, respectively. It will be noted that the complex data signal may be split by the inverse multiplexer 94 to provide parallel data channels VC1, VC2, VC3, VC4 and the like for distribution over a low bandwidth links such as the Airphone voice links 86. Where desired, a wideband modem 96 may be provided for direct wide band distribution instead of inverse multiplexed links. If no wideband capability is available, a single (non inverse multiplexed) voice link and modem can be used with corresponding limitations of poor image quality and low speed.

The system of the subject invention is adaptable for use in connection with any of the many communications links in use and being currently developed and deployed. There are currently three classes of communications links available: (1) narrow band primarily designed for audio communication services and adapted for data, (2) broader band digital circuit switched carriers such as Inmarsat, and (3) emerging broad band systems for providing broadcast television and Internet connectivity aboard the aircraft.

Examples of currently commercially available systems include:

Narrow Band Systems—Commercial

Airphone—GTE ground/satellite aircraft telephone service, up to 9600 bps/channel.

AirCell—special ground based cellular for aircraft up to 9600 bps

Global Star—satellite up to 9600 bps/channel

Narrow Band Systems—Government

VHF/UHF Aircraft Radio—up to 16 kbps ground based

VHF-UHF Military Radio—to intercept transports or ground stations air-to-air, or air-to-ground. (Can be line of sight, such as air-to-air or air-to-ground, or via satellite such as TACSAT (US Military Tactical Satellite) for over the horizon or long distance operations)—up to 16 kbps Broader Band Voice/Data Systems INMARSAT—satellite based air to ground, up to 64 kbps/channel Aero H-M4—satellite based 64 KBPS high speed ISDN enabled transfer IN-FLIGHT ENTERTAINMENT SYSTEMS—with downlinked TV—IP data comms adjunct for Internet that can also be utilized for security transmissions:

INMARSAT—satellite based packet data

Airia—Inmarsat Based L-BandAirTV—Alcatel S-Band

Airshow TV—Direct TV, Nimiq, Eutelesate, Hotbird Galazy, Nilesate and Measat

Connexion by Boeing—Loral Skymat (domestic)

IFN Globalstar—K and Ku Band

LiveTV—Hughes Direct TV

Existing US Military Tactical Imagery Systems:

PRISM—IDM—Photo Reconnaissance Intelligence Strike Module

FTI—Fast Tactical Imagery used by the US Navy

AIR-RIT—Aircraft Remote Image Transceiver—use by all US services

NAV-RIT—Naval Remote Image Transceiver—used in nautical operations

LVRS—Lightweight Video Reconnaissance System—used by US Army and Navy ground personnel, vehicles, and operations centers.

The specific communication links used will vary depending upon application and availability. The system is not link-specific but can be adapted to any communication link supporting the data and information to be transmitted.

In the preferred embodiment, channels of 64 kbps or greater are available to support full motion transmission. For example, 802.11 channels have more than adequate bandwidth for high quality video. 64 k kbps and 128 k kbps Inmarsat have sufficient bandwidth for moderate quality full motion video. But the resolution of full motion video over these circuits utilizing full motion image compression may not be adequate for identification of persons.

Another mode is implemented whereby high-resolution still images are recorded on the onboard server device. This allows a record of previous actions to be collected. If an event unfolds, the server may be queried by onboard, remote or intercept monitor stations and high quality imagery can be accessed.

Figure 8:
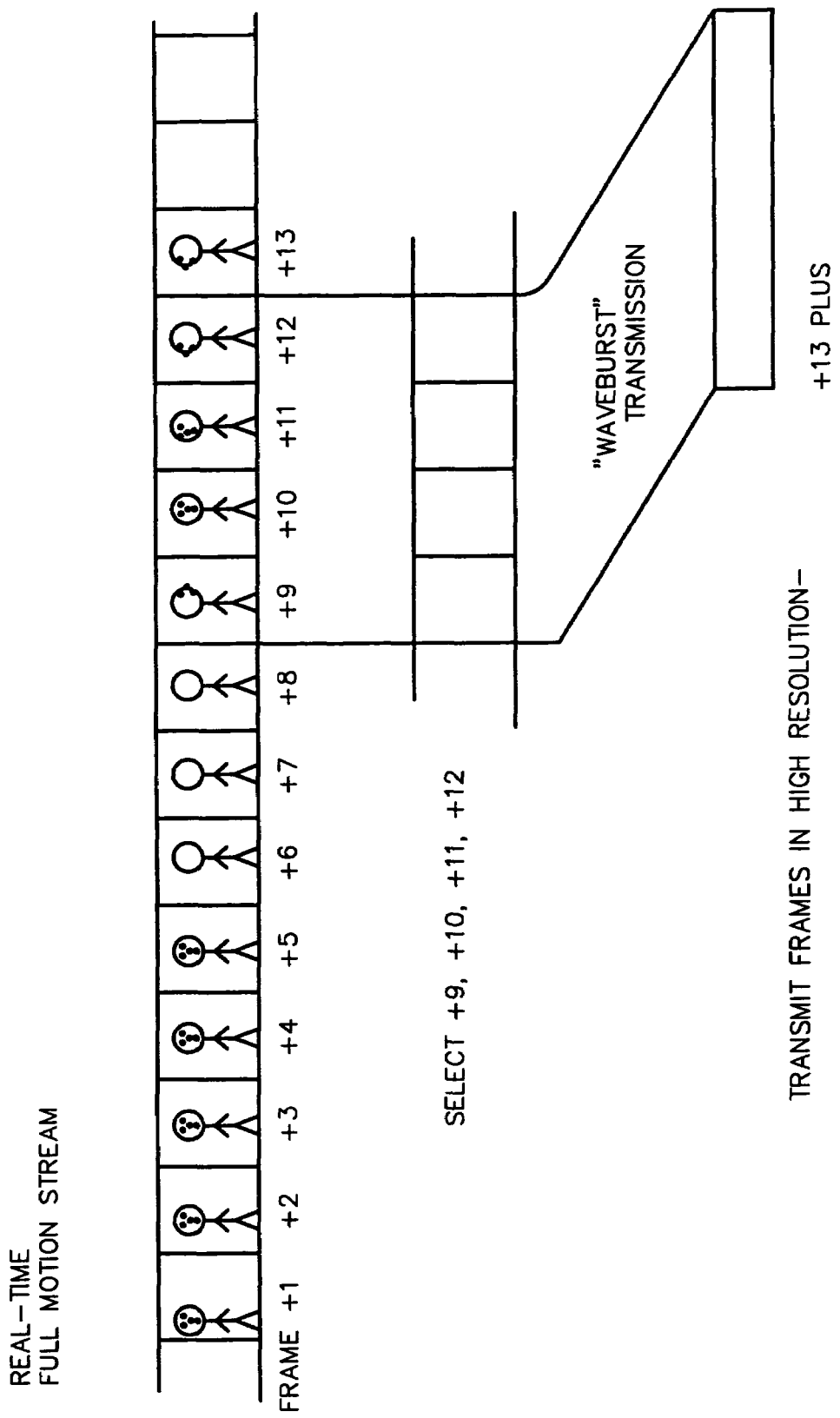
FIG. 8 is an illustration of a real time full motion stream with WaveBurst™ transmission capability. (WaveBurst is a trademark of PhotoTelesis Corporation.)

Sequences of images, called "WaveBurst" sequences can also be assembled and transmitted. A typical video signal for a single channel or single camera is shown in FIG. 8. As there shown, the frame-by-frame full motion stream for frames 1 through 13 is displayed. This represents the captured data. The selected frames for review may be any group such as here frames 9-12. These may be downloaded as high-resolution stills or as a lower resolution wave burst of streaming video. The frames are transmitted in high-resolution stills when aiding in image exploitation and as lower resolution streaming video when transmitted in a real-time mode.

Figure 9:
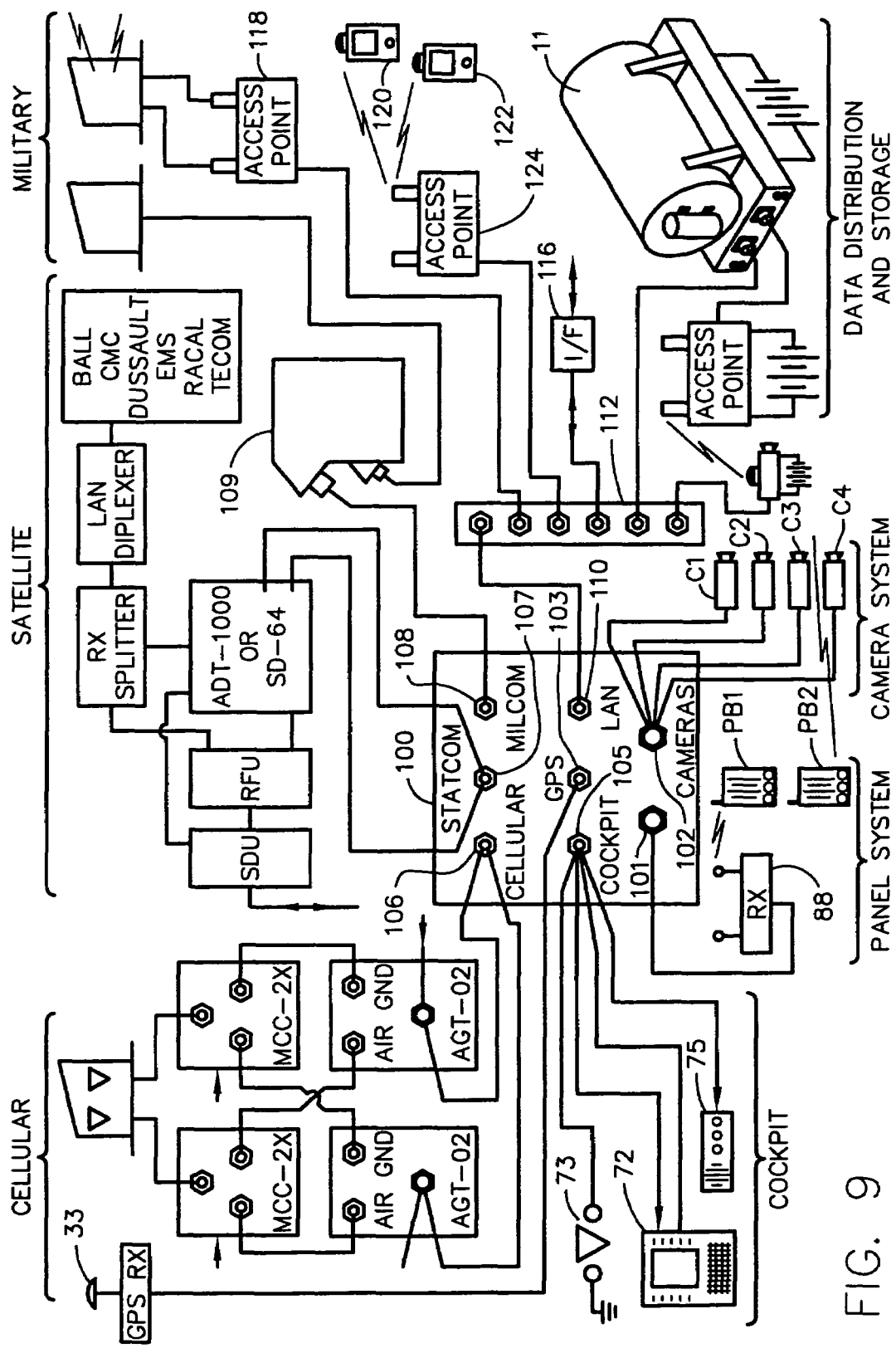
FIG. 9 is a schematic block diagram of a transport system in accordance with the subject invention.

The system architecture in the context of currently deployed aircraft communications systems is shown in FIG. 9. The heart of the system and the invention is the new system center module 100. Data and control signals, whether hard-wired or wireless are interconnected through this module. The various input devices such as the panic buttons PB1 and PB2 as well as cameras C1-C4 and other sensor devices and instruments are input at input ports 101, 102. A GPS signal receiver 33 may also provide input at 103. The combined data and video outputs and pilot user interface inputs are then distributed to the cockpit module via port 105, to a video display 72, and audio 75. A control panel 73 may be provided to the pilot for controlling distribution of information to the cockpit, and for indication of emergency conditions. Cellular transmission is via the multi communications controller from output port 106. AirCell as shown units provide both air and ground operation modes through the one port. The satellite communications scheme is via the output port 107, with a 64 kbps INMARSAT radio configuration shown. Other configurations are included. A military radio output port is provided via port 108 to the military radio 109. An AN/ARC 182(V) VHF-UHF AM/FM Radio Set is illustrated. Other configurations are included. LAN data may be introduced to the module and output from the module via LAN port 110 and the distribution hub/switch 112. Digital Cameras with IP connections (not shown) also interface to the hub/switch 112. This distributes the outgoing signals to one or more "black box" data IP recorder 114, to a wired LAN interface 116 for onboard LAN devices, to access point 124 for use by onboard wireless devices, to and to access point 118 for use by devices external to the transport. Portable, wireless monitors or PDA 120, 122 or laptops (not shown) as may be carried by onboard air marshal, by way of example, receive and transmit data via the access point 124 that is also in communication with the hub/switch 112.

These monitors will include the following functions:
Wireless Connection to Network and Server
Useful for Response Vehicles, Response Personnel, SWAT Teams, etc.
Streaming Video Support
Camera Selection GUI
Streaming Audio Support
Audio Source Selection
All Audio, Video, Event Historical Data Playback Supported
All Pulled Data Functions from on-board sensors Supported.

The aircraft video data recorder is adapted to perform as follows:
Records Analog Camera Inputs
Converts of Analog to Digital with Compression
Records in a variety of selected formats, for example:
High Resolution Periodic Stills such as JPEG or wavelet and/or
Compressed Motion such as MPEG1, MPEG 4 or Motion Wavelet
Records Events in parallel with Video and/or Images:
Time Code
Panic Button
Audio
Aircraft Status In the preferred embodiment, the aircraft IP data recorder will meet the following current FAA specifications:
Hardened Hermetic Enclosure, Meets Regulations
Impact: 3400 Gs, 6.5 mS
FAA approved crush specifications
Fire resistance to 1100 Degree C./30 Minutes
FAA approved underwater depth/duration specifications
underwater locator beacon:
Battery operational Li
Battery shelf life
Adequate record time equaling or exceeding FAA requirements.
Capable of recording any IP data
Encoded Video
Cockpit Video, Radar, MDF, etc.
Surveillance Camera Video
Encoded Audio
Radio Receptions into Aircraft
Radio Transmissions From Aircraft
Automated Flight System, Alarms, Audio
Open Microphones, Such as Cockpit
Encoded Aircraft Instrumentation, such as ARINC-429, Discretes, etc.
Encoded Aircraft Bus Data, such as ARINC-573, ARINC-717, etc.
Converts of Analog to Digital with Compression
Records Events in parallel with Video and/or Images
Time Code
Panic Button
Audio
Multiple Data Types
Time Perishable Data—Write Over at Periodic Increments—30 minutes, 120 minutes, etc., Audio, Video, etc.
Flight Perishable Data—Write Over on Each Flight—Take Off Time, Climb Data, Fuel Consumption, Landing Times, Engine Date, etc.
Long Term Data—Engine Hours, Number of Takeoffs, etc.
Data Access Based on Type of Data
Access Protection
Encryption Utilized
Passwords Utilized
Physical Port Restrictions Utilized
Least Secure: Wireless Access—Airlines to Aircraft Performance Data, etc.
Medium Security: Wired Access—Pilot reviewing Performance Data, etc.
Most Secure: Special Port Access—Private Audio/Video Data, etc.
Multiple Access Authority Levels, Specified Areas of Access based on Access Authority.
Audio—requires authority (password, encryption key) to access for privacy purposes.
Video—requires authority (password, encryption key) to access for privacy purposes.
Flight Data—available to Airline and CPSB for investigation
Long Term Data—available to Airline and CPSB for investigation
Integrated Network Features
Network Hub, Ethernet, etc.
Wireless LAN Access Points, 802.11, etc.
Protocol Converters, for ARINC-573, ARINC-717, etc.
Recorder can be a Server
Hardened Electronics
Memory Array
Underwater Locator
Battery for Underwater Locator
Non-Hardened Electronics
LAN hardware
Hub
NIC
Wireless Access Point
DCHP Server
Protocol Converters
Memory Storing System Software
Memory Storing Server Operating System
Power Supply and Monitoring
Environmental Monitoring
Battery Backup for Recorder Preferably, data recorder redundancy will be provided. Specifically, the subject invention permits and enhances redundancy by utilizing IP connections for easy data redundancy, where multiple (2 or more) recorders are connected via hub and may be located in the tail and the nose or other desired locations in the aircraft. Providing locations at both the tail and the nose provides better crash survival ability for the hardened recorder(s).

The detail of the command module 100 or system "black box" is more clearly shown in FIG. 10. The heart of the system is the controller/processor 130. The various camera inputs from camera encoders VENC1-VENC10 are introduced into the IP video multiplexer 132, which is controlled by the processor 130 to generate a combined video signal on line 134. The input to the video encoders is supplied by the various cameras (previously shown and described) through a video multiplexer 136. Analog video inputs are digitized by video encoders VENC1-VENC10. The outputs of the encoders are multiplexed by the IP video multiplexer 132. The IP output is then distributed via the bi-directional multiplexer circuit 138 to an IP interface 140 for distribution via the LAN interface 142. Audio signals are generated and controlled by the processor 130 and are decoded at audio decoder 143 for insertion on the ICS. The video signal is also introduced into the cockpit display 72. The displayed security video can be real-time data from the sensors form input B of selector 71, or historical data from the server or digital camera data as selected by input A of selector 71. Video decompression from real-time or recorded video sources is accomplished by the Video Decoder circuit.

The controller also manages distribution over the communications link networks including the satellite link, the cell phone link and the military radio as previously described.

It is an important feature of the subject invention that it greatly enhances the reconstruction of catastrophic events. While prior art wired cameras generally stop functioning upon breakup due to mechanical failures, electric failures and the like, the wireless cameras with independent power supply provide substantial immunity to these events. Data can be collected both before and during unfolding catastrophic events, even if they involve fire, airframe failure, and the like. This is largely due to the use of both wired and wireless cameras and sensors as contemplated by the preferred embodiment. Wired cameras are subject to power failure and communication failures due to:

Mechanical Failures
Electrical Failures
Fire
Bombs
Missile Attack
Catastrophic Airframe Failures
Sabotage Wireless Cameras with Battery Backup provide a large degree of immunity for the above. Data can be collected both before and during unfolding catastrophic events, even if they involve fire, airframe failure, etc. The cameras and server have independent battery backup, and the cameras and server have a wireless connection, such as:

IEEE 802.11
IEEE 802.11 with unique modifications
Unique Frequency Assignment
Adapted Protocol
Adapted Encryption The system greatly enhances post event reconstruction including catastrophic airframe investigations. While prior art wired cameras generally stop functioning upon breakup due to mechanical failures, electric failures and the like, the wireless cameras with independent power supply provide substantial immunity to these events. Data can be collected both before and during unfolding catastrophic events, even if they involve fire, airframe failure, and the like.

While certain embodiments and features of the invention have been described in detail herein, it will be readily understood that the invention includes all modifications and enhancements within the scope and spirit of the following claims.

What is claimed is:

1. A surveillance system for monitoring an aircraft while in route to a destination, the system comprising:
   a. a plurality of sensors mounted on the aircraft and adapted for generating data in response to conditions occurring on the aircraft, the data being generated on a near real-time basis in relation to conditions on the aircraft;
   b. a remote receiving station, the remote receiving station being remote from the aircraft;
   c. a wireless transmitter onboard the aircraft vehicle for transmitting data to the remote receiving station;
   d. an onboard IP network, supported on the aircraft, the onboard IP network being in communication with the plurality of sensors to convey data received from the plurality of sensors;
   wherein at least one of the plurality of sensors is a portable wireless panic button device, the portable wireless panic button device being supported for movement in common with a person aboard the aircraft, the portable wireless panic button device being manually operable by a person aboard the aircraft to generate panic button data, the panic button data corresponding to one of a plurality of event conditions potentially existing aboard the aircraft, the panic button data identifying at the remote receiving station one of the plurality of event conditions, the wireless panic button device being in wireless communication with the IP network to provide the panic button data to the IP network, the IP network, being in communication with the wireless transmitter to provide the panic button data to the wireless transmitter; and the wireless transmitter being operable to transmit the panic button data to the remote receiving station.

2. The system of claim 1 and further comprising:
   wherein the plurality of sensors includes at least one camera supported on the aircraft, the at least one camera being operable to provide visual image data of at least one monitored area onboard the aircraft;
   an onboard server supported on the aircraft, the onboard server being in communication with the IP network for receiving data, the onboard server being configured to store data;
   an onboard processor supported on the aircraft, the onboard processor being in communication with at least one of the following:
   the IP network, the at least one camera, and the onboard server;
   the onboard processor being configured to receive data generated by at least one of the following:
   the IP network, the at least one camera, and the onboard server,
   the onboard processor being operable to process data to provide processed data, the processed data including processed visual image data, the onboard processor being in communication with the IP network to provide to the IP network processed data;
   the transmitted data including processed visual image data, the processed image data being received by the remote receiving station, when received by the remote receiving station the processed visual image data corresponding on a near real-time basis with the visual image data.

3. A surveillance system for monitoring an aircraft while in route to a destination, the surveillance system comprising:
   a. a plurality of sensors mounted on the aircraft and adapted for generating data in response to conditions occurring on the aircraft, the data being generated on a near real-time basis in relation to conditions on the aircraft;
   b. a remote receiving station, the remote receiving station being remote from the aircraft;
   c. a wireless transmitter onboard the aircraft for transmitting data to the remote receiving station;
   d. an onboard IP network supported on the aircraft, the onboard IP network being in communication with the plurality of sensors to convey data received from the plurality of sensors;
   wherein at least one of the plurality of sensors is a portable wireless panic button device, the portable wireless panic button device being supported for movement in common with a person aboard the aircraft, the portable wireless panic button device being manually operable by a person aboard the aircraft to generate panic button data, the panic button data corresponding to one of a plurality of event conditions potentially existing aboard the aircraft, the panic button data identifying at the remote receiving station one of the plurality of event conditions, the wireless panic button device being in wireless communication with the IP network to provide the panic button data to the IP network, the IP network being in communication with the wireless transmitter to provide the panic button data to the wireless transmitter, the wireless transmitter being operable to transmit the panic button data to the remote receiving station;

wherein the plurality of sensors includes at least one camera supported on the aircraft, the at least one camera being operable to provide visual image data of at least one monitored area onboard the aircraft;

e. an onboard server supported on the aircraft, the onboard server being in communication with the IP network for receiving data, the onboard server being configured to store data;

f. an onboard processor supported on the aircraft, the onboard processor being in communication with at least one of the following: the IP network, the at least one camera and the onboard server;

the onboard processor being configured to receive data generated by at least one of the following: the IP network, the at least one camera and the onboard server; the onboard processor being operable to process data to provide processed data, the processed data including processed visual image data, the onboard processor being in communication with the IP network to provide to the IP network processed data; and the transmitted data including processed visual image data; the processed image data being received by the remote receiving station, when received by the remote receiving station the processed visual image data corresponding on a near real-time basis with the visual image data.

\* \* \* \* \*